US012807237B2

(12) United States Patent
Woo et al.

(10) Patent No.: US 12,807,237 B2
(45) Date of Patent: Nov. 24, 2026

(54) FASTENING APPARATUS FOR VEHICLE

(71) Applicant: HYUNDAI MOBIS Co., Ltd., Seoul (KR)

(72) Inventors: Hyun Jin Woo, Yongin-si (KR); Hyoun Young Oh, Yongin-si (KR); Ho Youn Hwang, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 214 days.

(21) Appl. No.: 18/083,744

(22) Filed: Dec. 19, 2022

(65) Prior Publication Data

US 2023/0242187 A1 Aug. 3, 2023

(30) Foreign Application Priority Data

Feb. 3, 2022 (KR) ........................ 10-2022-0014082
Feb. 17, 2022 (KR) ........................ 10-2022-0020923

(51) Int. Cl.
*B62D 27/02* (2006.01)
*F16B 7/04* (2006.01)
*F16B 21/16* (2006.01)

(52) U.S. Cl.
CPC .............. *B62D 27/02* (2013.01); *F16B 7/042* (2013.01); *F16B 21/165* (2013.01)

(58) Field of Classification Search
CPC ......... B62D 27/02; B62D 24/00; F16B 7/042; F16B 7/1409; F16B 21/165; F16B 2/16;
(Continued)

(56) References Cited

U.S. PATENT DOCUMENTS 3,793,685 A * 2/1974 Knecht .................... B63B 21/00
439/348
3,827,110 A * 8/1974 Dzus, Sr. .................. F16B 5/10
411/348
(Continued)

FOREIGN PATENT DOCUMENTS

CN 111384330 A * 7/2020 ............ H01M 50/20
CN 212400875 U * 1/2021
(Continued)

OTHER PUBLICATIONS

Extended European Search Report issued Oct. 4, 2023 for corresponding European Patent Application No. 22214311.7.
(Continued)

*Primary Examiner* — Kristina R Fulton
*Assistant Examiner* — Jock Wong
(74) *Attorney, Agent, or Firm* — Morgan, Lewis & Bockius LLP

(57) ABSTRACT

A fastening apparatus for a vehicle may include: a first fastener fixed to a first structure, a second fastener coupled to a case fixed to a second structure and configured to have the first fastener inserted therein, a fixing unit movably installed in the second fastener and configured to move in a direction that intersects a direction in which the first fastener is inserted, and to selectively limit relative movements of the first fastener and the second fastener, and an elevation unit installed in the case in a way to move up and down, and configured to be moved up and down by an external force that is applied from a work tool and adjust the direction in which the fixing unit moves.

13 Claims, 28 Drawing Sheets

(58) Field of Classification Search
CPC .... B60K 2001/0438; B60K 2001/0472; B60K 1/04
USPC .................................................. 411/511, 348
See application file for complete search history.

(56) References Cited

U.S. PATENT DOCUMENTS

| | | | | | |
|---|---|---|---|---|---|
| 4,082,342 | A * | 4/1978 | Ailshie | B62D 33/071 292/144 |
| 4,477,121 | A * | 10/1984 | Atkins | B60B 37/04 301/124.2 |
| 4,679,862 | A | 7/1987 | Luo | |
| 5,160,180 | A * | 11/1992 | Mlynarczyk | E05C 5/02 411/433 |
| 6,793,248 | B1 | 9/2004 | Sung | |
| 2007/0087612 | A1* | 4/2007 | Tsujita | F16B 21/165 439/346 |
| 2012/0243932 | A1* | 9/2012 | McCann | F16B 21/165 403/287 |
| 2021/0362579 | A1* | 11/2021 | Kumagai | B62D 21/02 |

FOREIGN PATENT DOCUMENTS

| | | | | |
|---|---|---|---|---|
| CN | 112377493 | A * | 2/2021 | |
| CN | 113525164 | A * | 10/2021 | |
| CN | 113525165 | A * | 10/2021 | |
| CN | 214396386 | U * | 10/2021 | |
| CN | 113635753 | A * | 11/2021 | |
| CN | 113682192 | A * | 11/2021 | |
| CN | 113715679 | A * | 11/2021 | |
| CN | 113752815 | A * | 12/2021 | |
| DE | 4040956 | A1 | 7/1992 | |
| DE | 19503816 | A1 * | 8/1996 | B60Q 5/003 |
| DE | 19650447 | A1 * | 6/1998 | F16B 21/165 |
| DE | 102005052646 | A1 | 5/2007 | |
| DE | 202017100794 | U1 | 5/2017 | |
| EP | 1529965 | A2 * | 5/2005 | F16B 2/16 |
| EP | 3223341 | A1 * | 9/2017 | B60K 1/04 |
| GB | 2272251 | A * | 5/1994 | B60N 2/01558 |
| JP | 2006083917 | A * | 3/2006 | |
| JP | 2017187102 | A * | 10/2017 | F16B 2/16 |
| JP | 2021-84599 | A | 6/2021 | |
| KR | 10-2021-0077367 | A | 6/2021 | |
| WO | WO-2009027734 | A2 * | 3/2009 | F16B 21/165 |

OTHER PUBLICATIONS

Partial European Search Report issued Jun. 28, 2023 for corresponding European Patent Application No. 22214311.7.

Office Action issued on May 21, 2026 in the corresponding Korean Patent Application No. 10-2022-0014082.

* cited by examiner

FASTENING APPARATUS FOR VEHICLE

CROSS-REFERENCE TO RELATED APPLICATION

This application claims priority from and the benefit of Korean Patent Application No. 10-2022-0014082 filed on Feb. 3, 2022, and Application No. 10-2022-0020923 filed on Feb. 17, 2022 which is hereby incorporated by reference for all purposes as if set forth herein.

BACKGROUND

Technical Field

Exemplary embodiments of the present disclosure relate to a fastening apparatus for a vehicle, and more particularly, to a fastening apparatus for a vehicle, wherein a top hat or a battery module can be easily mounted on or separated from the chassis frame of a purpose built vehicle (PBV).

Discussion of the Background

In general, a purpose built vehicle (PBV) means a future type vehicle in which a user can freely use the indoor space of the PBV according to his or her purpose so that the user can be provided with a required customized service while the user moves to a destination with the development of the autonomous driving technology.

Such a PBV has a structure in which a top hat, that is, an upper vehicle body designed according to a user's purpose, is coupled to a chassis frame having a skateboard form in which a battery module is widely disposed on the lower side of the PBV. Accordingly, it is necessary to develop a new fastening structure through which the top hat or the battery module can be easily replaced from the chassis frame of the PBV and the automation of an assembly can be implemented.

The background technology of the present disclosure was disclosed in Korean Patent Application Publication No. 10-2021-0077367 (entitled "VEHICLE BODY ASSEMBLY STRUCTURE" laid open on Jun. 25, 2021).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various embodiments are directed to providing a fastening apparatus for a vehicle, wherein a top hat or a battery module can be easily mounted on or separated from the chassis frame of a purpose built vehicle (PBV).

In an embodiment, a fastening apparatus for a vehicle includes a first fastener fixed to a first structure, a second fastener coupled to a case fixed to a second structure and configured to have the first fastener inserted therein, a fixing unit movably installed in the second fastener and configured to move in a direction that intersects a direction in which the first fastener is inserted, and to selectively limit relative movements of the first fastener and the second fastener, and an elevation unit installed in the case in a way to move up and down, and configured to be moved up and down by an external force that is applied from a work tool and adjust the direction in which the fixing unit moves.

Furthermore, the first fastener includes a first body inserted into the second fastener and a trapping part concavely depressed from the outside of the first body.

Furthermore, the first fastener further includes an entry guider extended from the first body and configured to provide guidance to the first body so that the first body enters the second fastener.

Furthermore, the entry guider is formed so that the width of the entry guider is reduced toward an end thereof.

Furthermore, the second fastener includes a flange coupled to an inner side of the case, a second body extended from the flange in the direction in which the first fastener is inserted and configured to have the first body inserted therein, and an accommodation part formed to penetrate the second body and configured to support the fixing unit in a way to be movable in a radial direction of the second body.

Furthermore, the accommodation part is formed so that the width of the accommodation part is reduced toward the inside of the second body.

Furthermore, the accommodation part is provided in a plural number. The plurality of accommodation parts is disposed to be spaced apart from each other along a circumference of the second body.

Furthermore, as the first body is fully inserted into the second body, the accommodation part is connected to the trapping part.

Furthermore, the elevation unit includes an elevation member disposed to surround the second fastener and installed in a way to be slidable in a length direction of the second fastener, and a guide member provided between the elevation member and the second fastener and configured to provide guidance to a movement of the fixing unit while operating in conjunction with an elevation movement of the elevation member.

Furthermore, the guide member includes a first guide member concavely depressed from an inner side of the elevation member and configured to dispose the fixing unit at a first location, a second guide member configured to protrude from the inner side of the elevation member and to dispose the fixing unit at a second location, and a third guide member provided between the first guide member and the second guide member and configured to provide guidance to a movement of the fixing unit from any one of the first location and the second location to the other of the first location and the second location.

Furthermore, the third guide member is rounded with designated curvature.

Furthermore, the fastening apparatus further includes a restoration unit configured to restore the elevation unit to an initial location as the external force applied from the work tool to the elevation unit is released.

Furthermore, the restoration unit is installed between the case and the elevation unit and is provided in a way to be stretchable in a length direction thereof.

Furthermore, both ends of the restoration unit come into surface contact with the case and the elevation unit.

Furthermore, each of the both ends of the restoration unit has a semicircle-shaped cross-section form.

Furthermore, the fastening apparatus further includes a detachment prevention unit coupled to the second fastener and configured to prevent the elevation unit from being detached from the case.

In another embodiment, a fastening apparatus for a vehicle includes a first fastener fixed to a first structure, a case fixed to a second structure, disposed to face the first fastener, and configured to have the first fastener inserted therein, an elevation unit installed in the case in a way to move up and down, a second fastener rotatably coupled to the elevation unit, fastened to or separated from the first fastener depending on a rotation direction thereof, and moved up and down along with the elevation unit, and a restoration unit configured to restore the elevation unit to its initial location as the second fastener is separated from the first fastener.

Furthermore, the elevation unit includes an elevation member installed within the case and configured to have the second fastener inserted therein, an elevation guide member extended from an outer circumference surface of the elevation member and slidably coupled to the case, and a support member extended from an inner circumference surface of the elevation member and configured to rotatably support the second fastener and to have a free end formed to be round.

Furthermore, the second fastener includes a second fastening member disposed within the elevation member and configured to have a screw thread provided on an inner circumference surface thereof, a hook extended from an outer circumference surface of the second fastening member and provided over the support member, a flange extended from the outer circumference surface of the second fastening member, spaced apart from the hook, provided under the hook, and configured to have the support member seated therein, and an insertion groove provided between the hook and the flange and configured to have the support member inserted therein and to have an inner side coming into contact with the free end of the support member formed to be round.

Furthermore, the restoration unit includes an elastic member installed between the case and the elevation unit and stretchably provided in a length direction thereof.

The fastening apparatus for a vehicle according to the present disclosure can prevent the waste of a machine and manpower for an additional feeding work and a loss of parts upon assembly because parts necessary for the fastening of the first structure and the second structure can be implemented as one assembly.

Furthermore, the fastening apparatus for a vehicle according to the present disclosure can be more rapidly assembled and is advantageous in terms of the automation of an assembly because the state in which the first fastener and the second fastener have been coupled can be adjusted by only an elevation movement of the elevation unit.

Furthermore, the fastening apparatus for a vehicle according to the present disclosure can improve efficiency and consistency of an assembly because the fastening and separation of the first fastener and the second fastener can be repeatedly performed by the restoration unit.

DETAILED DESCRIPTION OF THE ILLUSTRATED EMBODIMENTS

Figure 1:
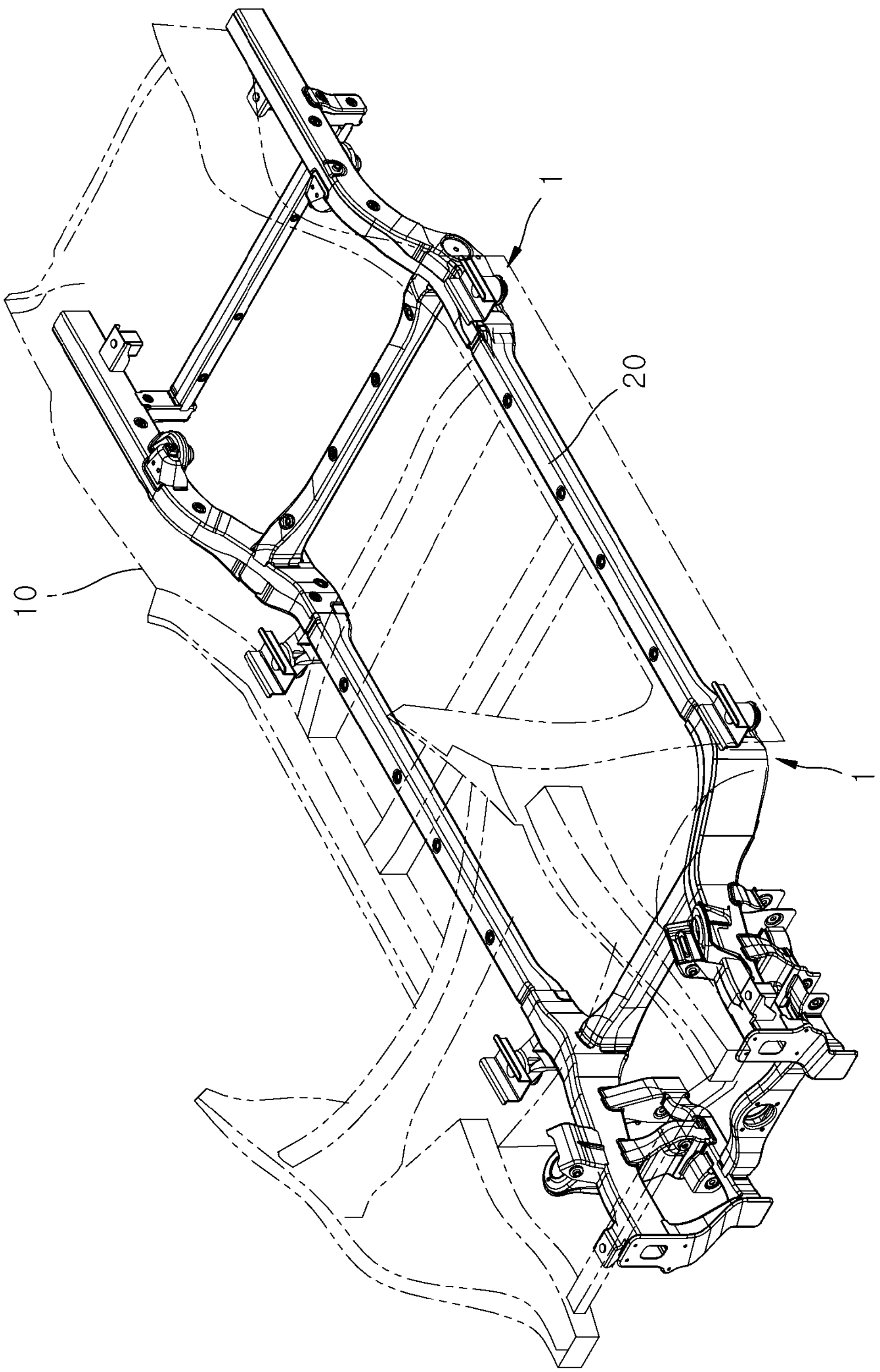
FIG. 1 is an installation state diagram schematically illustrating the state in which a fastening apparatus for a vehicle according to a first embodiment of the present disclosure has been installed.

The following detailed description is provided to assist the reader in gaining a comprehensive understanding of the methods, apparatuses, and/or systems described herein.

However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Figure 2:
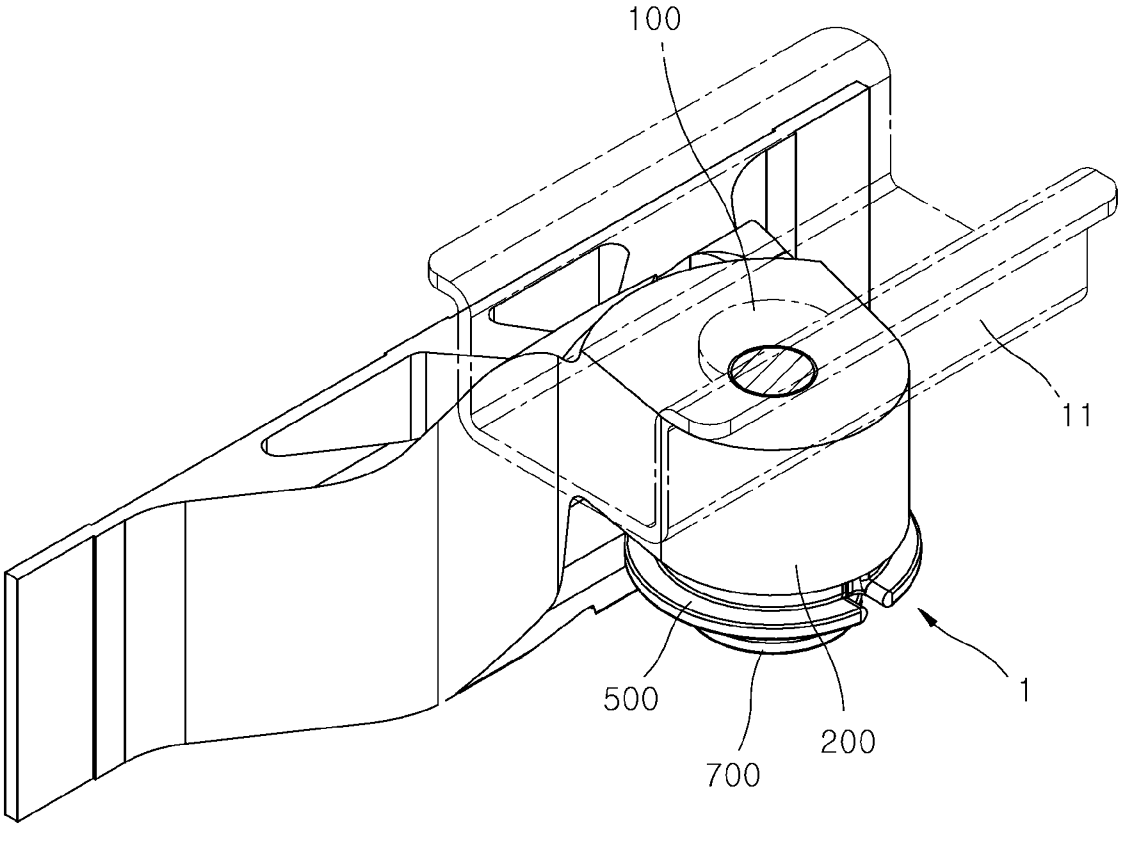
FIG. 2 is a perspective view schematically illustrating a construction of the fastening apparatus for a vehicle according to the first embodiment of the present disclosure.
Figure 3:
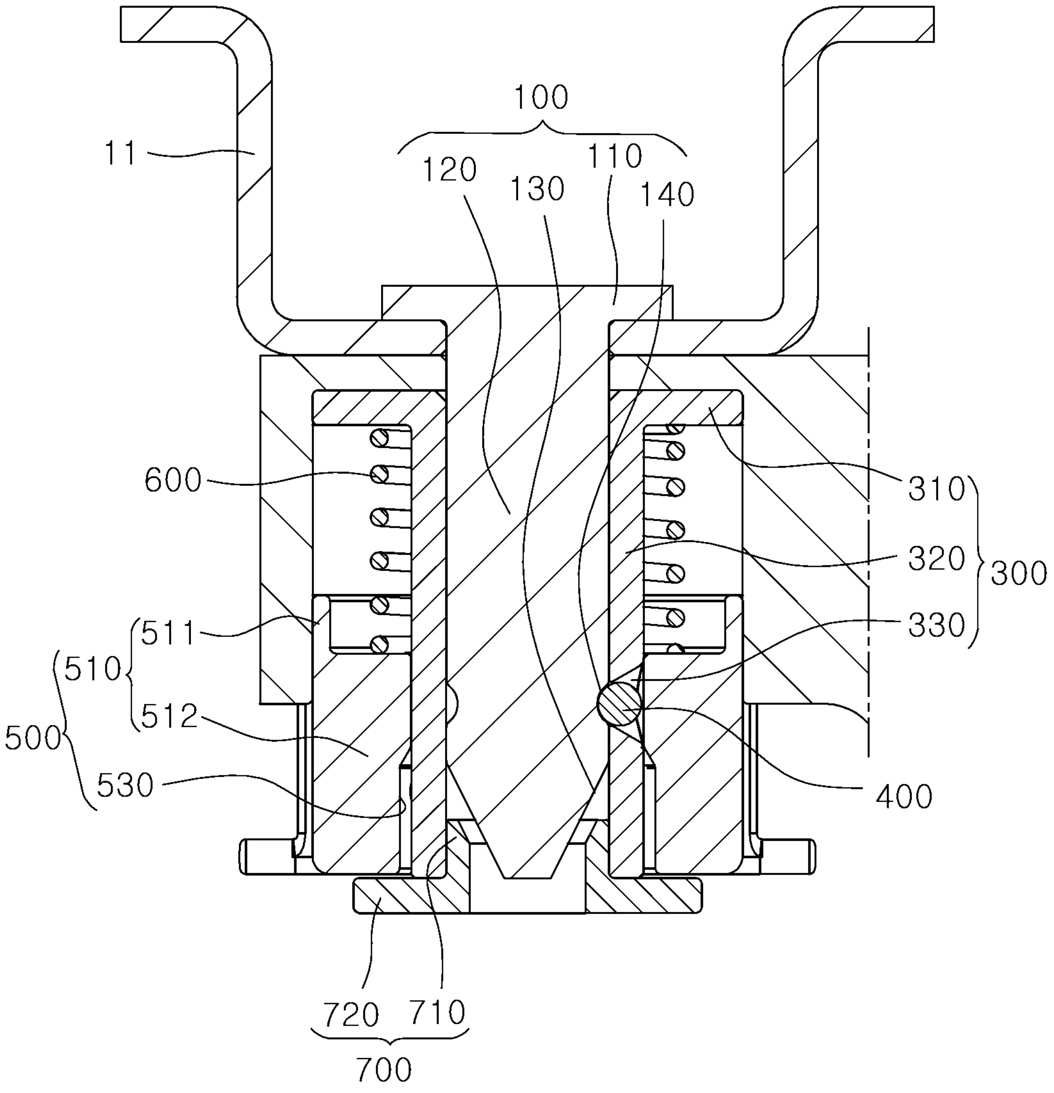
FIG. 3 is a cross-sectional view schematically illustrating a construction of the fastening apparatus for a vehicle according to the first embodiment of the present disclosure.
Figure 4:
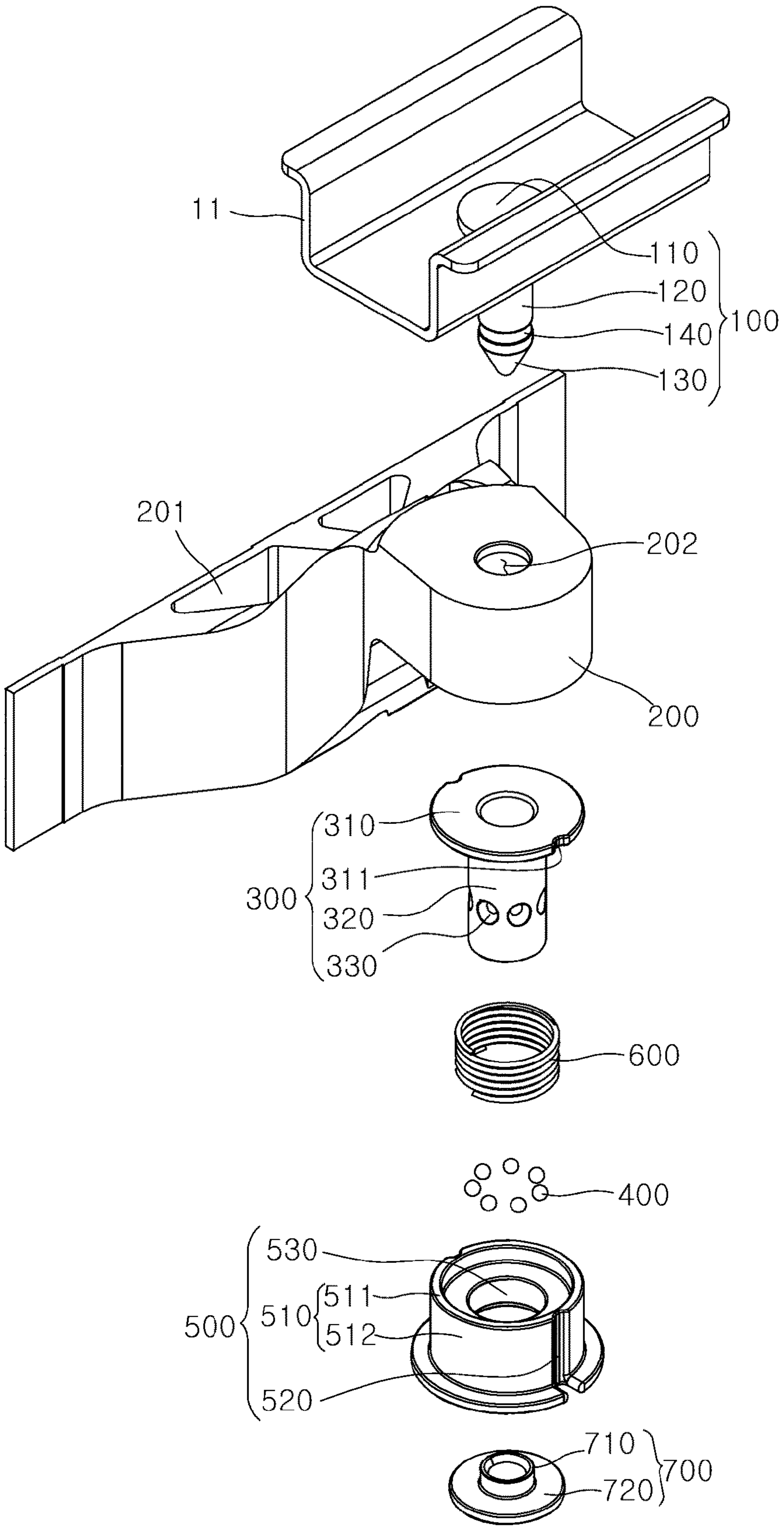
FIG. 4 is an exploded perspective view schematically illustrating a construction of the fastening apparatus for a vehicle according to the first embodiment of the present disclosure.

FIG. 1 is an installation state diagram schematically illustrating the state in which a fastening apparatus for a vehicle according to the first embodiment of the present disclosure has been installed. FIG. 2 is a perspective view schematically illustrating a construction of the fastening apparatus for a vehicle according to the first embodiment of the present disclosure. FIG. 3 is a cross-sectional view schematically illustrating a construction of the fastening apparatus for a vehicle according to the first embodiment of the present disclosure. FIG. 4 is an exploded perspective view schematically illustrating a construction of the fastening apparatus for a vehicle according to the first embodiment of the present disclosure.

Referring to FIGS. 1 to 4, a fastening apparatus 1 for a vehicle according to the first embodiment of the present disclosure includes a first fastener 100, a case 200, a second fastener 300, a fixing unit 400, an elevation unit 500, a restoration unit 600, and a detachment prevention unit 700.

A first structure 10 and a second structure 20 that are described hereinafter may be exemplified as a top hat corresponding to a vehicle body which can be customized and replaced depending on a user's purpose and a chassis frame that is installed on the lower side of a vehicle and that structurally supports the vehicle, respectively. However, the first structure 10 and the second structure 20 are not limited to the top hat and the chassis frame, and may be variously changed in design as different structures which may be fastened together and separated from each other in a vehicle, such as a chassis frame and a battery module.

The first fastener 100 is fixed to the first structure 10 and is fastened to the second fastener 300 through the medium of the fixing unit 400 that is described later, and mutually fixes the first structure 10 and the second structure 20.

Figure 5:
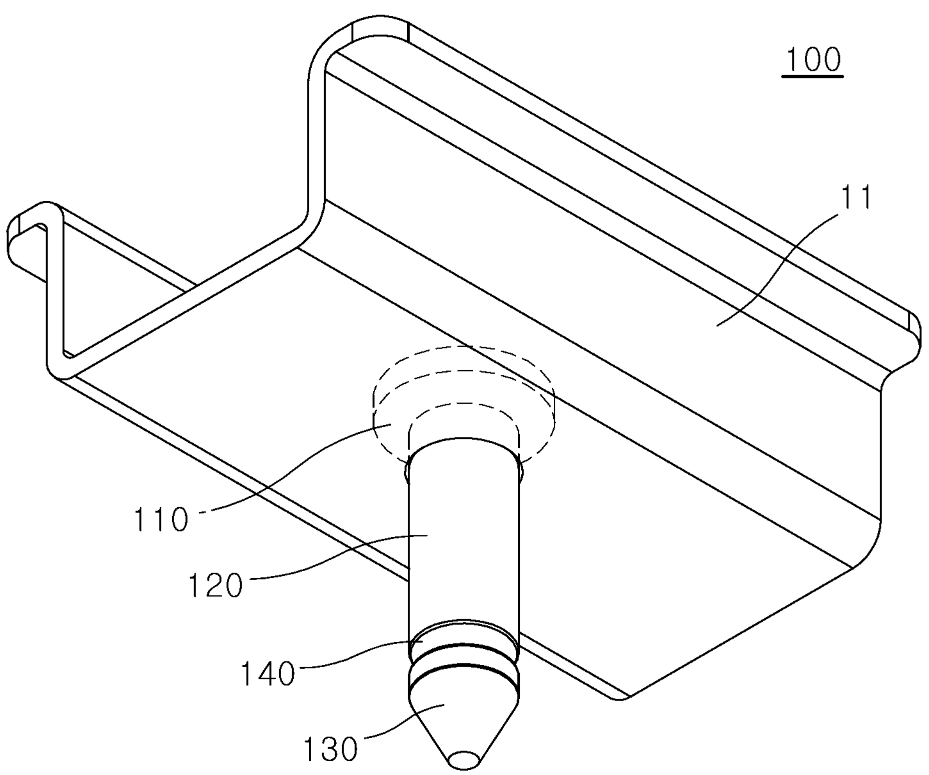
FIG. 5 is a perspective view schematically illustrating a construction of a first fastener according to the first embodiment of the present disclosure.

FIG. 5 is a perspective view schematically illustrating a construction of the first fastener according to the first embodiment of the present disclosure.

Referring to FIGS. 1 to 5, the first fastener 100 according to the present disclosure includes a head unit 110, a first body 120, an entry guider 130, and a trapping part 140.

The head unit 110 forms an external appearance of the top of the first fastener 100 according to the present disclosure, and generally supports a second body 320 and the entry guider 130 that are described later. The head unit 110 according to the present disclosure is seated and fixed to the inner side of a bracket part 11 that is coupled to the first structure 10. The head unit 110 may be welded or bonded to the inner side of the bracket part 11 and integrally coupled to the bracket part 11. A detailed shape of the head unit 110 may be changed in design in various forms which may be seated and fixed to the inner side of the bracket part 11, in addition to the circular shape illustrated in FIG. 4.

The first body 120 is extended from the head unit 110, and forms an external appearance of a central part of the first fastener 100. The first body 120 according the present disclosure may be formed to have a form of a rod that is perpendicularly extended downward from the inner side of the head unit 110. The second body 320 penetrates the inner side of the bracket part 11, and is extended downward from the bracket part 11.

The entry guider 130 is extended from the first body 120, and forms an external appearance of a lower part of the first fastener 100. The entry guider 130 is provided to provide guidance to the first body 120 so that the first body 120 enters the inside of the second fastener 300 in a process of the first fastener 100 and the second fastener 300 being fastened together. The entry guider 130 according to the present disclosure is perpendicularly extended downward from the lower end of the first body 120. The entry guider 130 is formed so that the width of the entry guider 130 is reduced toward an end thereof. Accordingly, the entry guider 130 may be formed to have approximately a shape of a cone.

The trapping part 140 is provided between the head unit 110 and the entry guider 130, and is formed to have a form of a groove that is concavely depressed from the outside of the first body 120. The trapping part 140 is extended to form a looped curve in the circumferential direction of the first body 120.

The case 200 is fixed to the second structure 20, and generally supports the second fastener 300 and the elevation unit 500 that are described later. The first fastener 100 is inserted into the case 200 through the top of the case 200 so that a fastening operation of the first fastener 100 and the second fastener 300 is performed within the case 200.

Figure 6A:
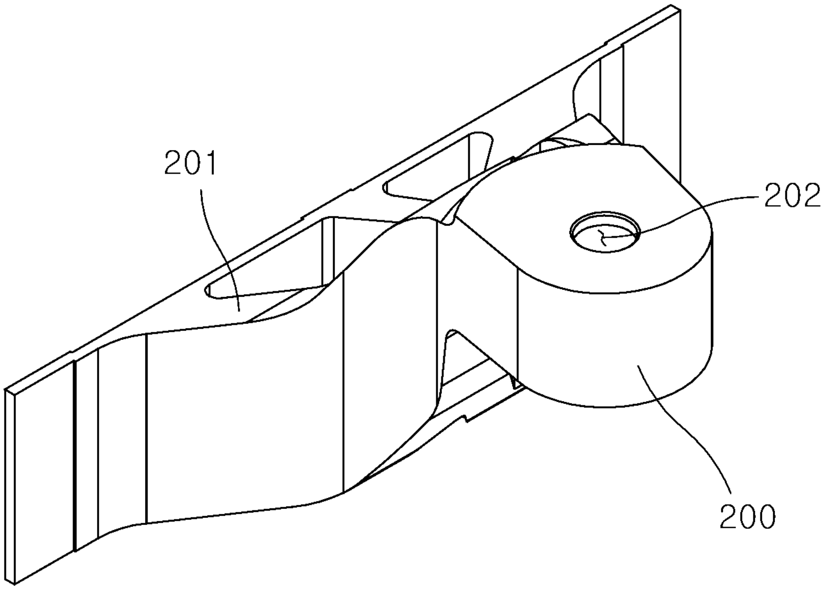
FIGS. 6A and 6B are a perspective view schematically illustrating a construction of a case according to the first embodiment of the present disclosure.
Figure 6B:
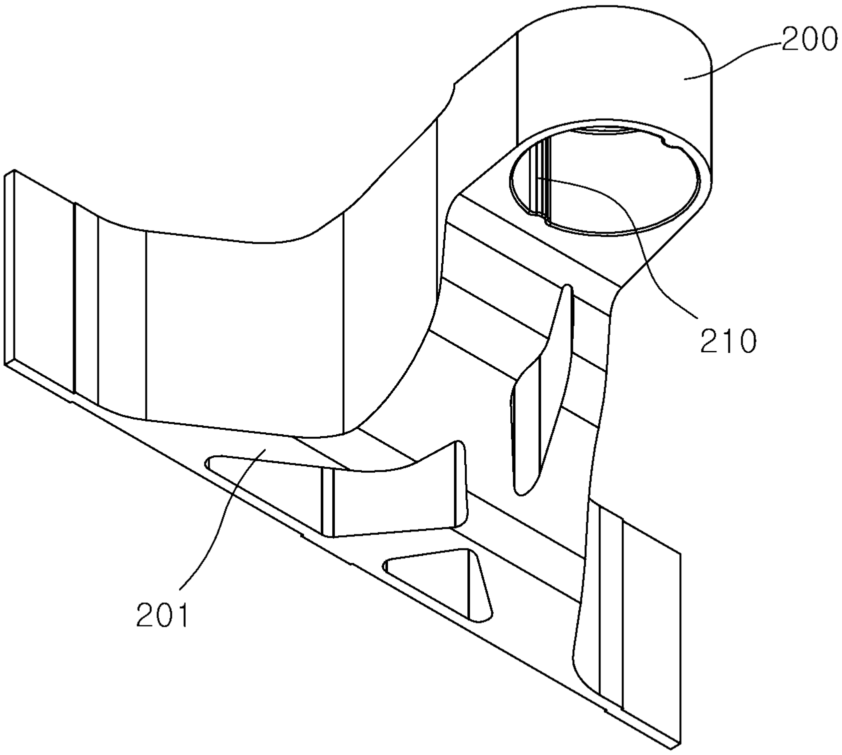

FIGS. 6A and 6B are a perspective view is a cross-sectional view schematically illustrating a construction of the case according to the first embodiment of the present disclosure.

Referring to FIGS. 6A and 6B, the case 200 according to the present disclosure may have an empty inside, and may be formed to have a cylindrical shape the bottom of which is opened. The length direction of the case 200 is parallel to the length direction of the first fastener 100. The case 200 may be supported against the second structure 20 through the medium of an assembly part 201 that is extended from the side of the case 200. In this case, the assembly part 201 may be integrally coupled to the second structure 20 by welding or bonding, or may be detachably coupled to the second structure 20 by bolting.

An insertion hole part 202 into which the first fastener 100 is inserted is formed at the top of the case 200. The insertion hole part 202 according to the present disclosure may be formed to have a form of a hole that perpendicularly penetrates the top of the case 200 up and down. The insertion hole part 202 may be formed to have a diameter greater than the diameter of the first body 120 so that an operation of the first fastener 100 being inserted into the insertion hole part 202 is smoothly performed.

A rail part 210 may be formed within the case 200. The rail part 210 according to the present disclosure perpendicularly protrudes from the inner circumference surface of the case 200 toward an internal space of the case 200. However, the rail part 210 is not limited to such a shape, and may be formed in the form of a groove that is concavely depressed from the inner circumference surface of the case 200 toward the outer circumference surface of the case 200. The length direction of the rail part 210 is extended in parallel to the length direction of the case 200. The rail part 210 may be provided in a plural number. In this case, the plurality of rail parts 210 may be spaced apart from each other and disposed along an inner circumference surface of the case 200.

The second fastener 300 is coupled to the case 200 and the first fastener 100 is inserted into the second fastener 300. The second fastener 300 is fastened to the first fastener 100 through the medium of the fixing unit 400 that is described later, and mutually fixes the first structure 10 and the second structure 20.

Figure 7:
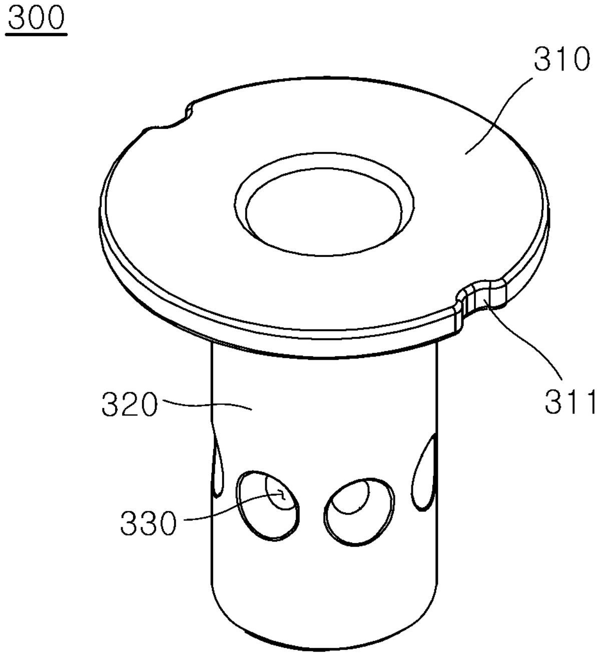
FIG. 7 is a perspective view schematically illustrating a construction of a second fastener according to the first embodiment of the present disclosure.

FIG. 7 is a perspective view schematically illustrating a construction of the second fastener according to the first embodiment of the present disclosure.

Referring to FIGS. 3 and 7, the second fastener 300 according to the present disclosure includes a flange 310, a second body 320, and an accommodation part 330.

The flange 310 forms an external appearance of the top of the second fastener 300 according to the present disclosure, and is coupled to the inner side of the case 200. The flange 310 according to the present disclosure may be formed to have a hollow disk shape in the central part of which a through hole is formed. The top of the flange 310 is seated and fixed to the lower side of the top of the case 200. The flange 310 may be welded or bonded to the lower side of the top of the case 200, and may be integrally coupled to the case 200. A detailed shape of the flange 310 may be changed in design in various forms which may be fixed to the case 200, in addition to the circular shape illustrated in FIG. 7.

An assembly guide member 311 is provided at the outer circumference surface of the flange 310. The assembly guide member 311 according the present disclosure may be formed to have a form of a groove which is concavely depressed from the outer circumference surface of the flange 310 toward the inside of the flange 310 in a radial direction thereof. The rail part 210 that is formed in the case 200 is seated in the assembly guide member 311. Accordingly, the assembly guide member 311 provides guidance to an operation of the second fastener 300 being inserted into the case 200 and prevents the second fastener 300 from being arbitrarily rotated within the case 200. The assembly guide member 311 is provided in a plural number. The plurality of assembly guide members 311 is disposed in the circumferential direction of the flange 310 in a way to be spaced apart from each other at designated intervals. The number of assembly guide members 311 and an interval between the assembly guide members 311 correspond to the number of rail parts 210 and an interval between the rail parts 210, respectively.

The second body 320 forms an external appearance of the lower part of the flange 310, and provides a space in which the accommodation part 330 described later may be installed. The second body 320 is perpendicularly extended downward from the flange 310 according to the present disclosure in the direction in which the first fastener 100 is inserted. The second body 320 is formed to have a hollow cylindrical shape both sides of which are opened, and is connected to the through hole that is formed in the central part of the flange 310. The first body 120 is inserted into the second body 320 after sequentially passing through the case 200 and the flange 310 in a process of the first fastener 100 and the second fastener 300 being fastened.

The accommodation part 330 is formed to penetrate the second body 320, and supports the fixing unit 400 that is described later in a way to be movable in the radial direction of the second body 320. The accommodation part 330 according to the present disclosure may be formed to have a form of a hole that transversely penetrates the outer circumference surface of the second body 320. The accommodation part 330 is provided in a plural number. The plurality of accommodation parts 330 is disposed along the circumference of the second body 320 in a way to be spaced apart from each other at designated intervals.

The accommodation part 330 may be formed so that the width of the accommodation part 330 is reduced toward the inside of the second body 320. That is, the accommodation part 330 is slantly extended at a designated angle from the outer circumference surface of the second body 320 toward the inner circumference surface of the second body 320. Accordingly, the accommodation part 330 can induce the fixing unit 400 to move from a second location to a first location as will be described later by its own weight even without a separate external force. The diameter of an end of the accommodation part 330 on one side thereof, which penetrates the inner circumference surface of the accommodation part 330, is formed to be smaller than the diameter of the fixing unit 400. Furthermore, the diameter of an end of the accommodation part 330 on the other side thereof, which penetrates the outer circumference surface of the accommodation part 330, is formed to be greater than the diameter of the fixing unit 400.

The accommodation part 330 is connected to the trapping part 140 as the first body 120 is fully inserted into the second body 320. Such a case in which the first body 120 has been fully inserted into the second body 320 may be exemplified as the state in which the bottom of the bracket part 11 has come into contact with the top of the case 200.

The fixing unit 400 is movably installed in the second fastener 300. The fixing unit 400 is moved in a direction that intersects the direction in which the first fastener 100 is inserted, and selectively limits relative movements of the first fastener 100 and the second fastener 300. The fixing unit 400 according to the present disclosure is formed to have approximately a form of a sphere, and is installed within the accommodation part 330. The fixing unit 400 is provided in a plural number. The plurality of fixing units 400 is individually installed within the plurality of accommodation parts 330. The fixing unit 400 is moved to the first location or the second location within the accommodation part 330 by an elevation movement of the elevation unit 500 that is described later, and changes the state in which the first fastener 100 and the second fastener 300 have been fastened.

Figure 8:
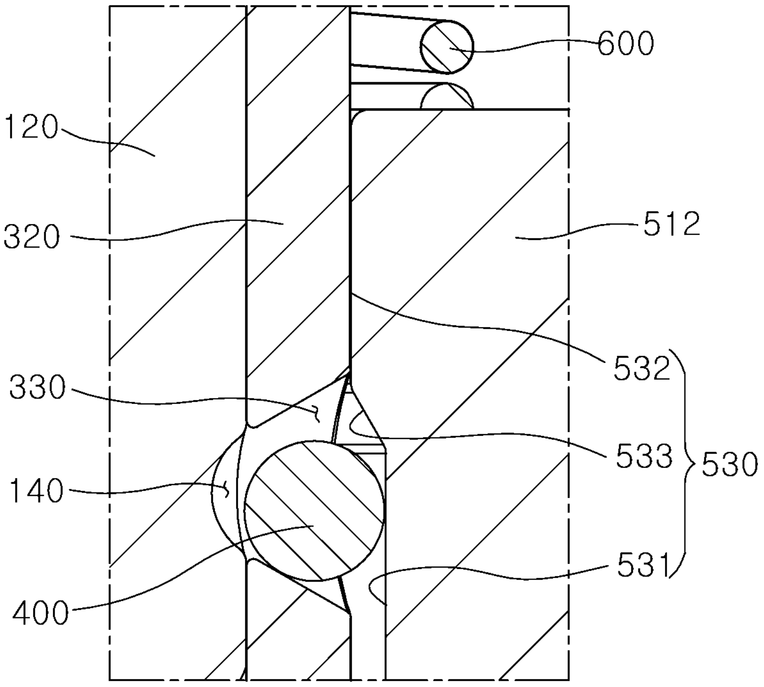
FIG. 8 is a diagram illustrating the state in which a fixing unit according to the first embodiment of the present disclosure has been disposed at a first location.
Figure 9:
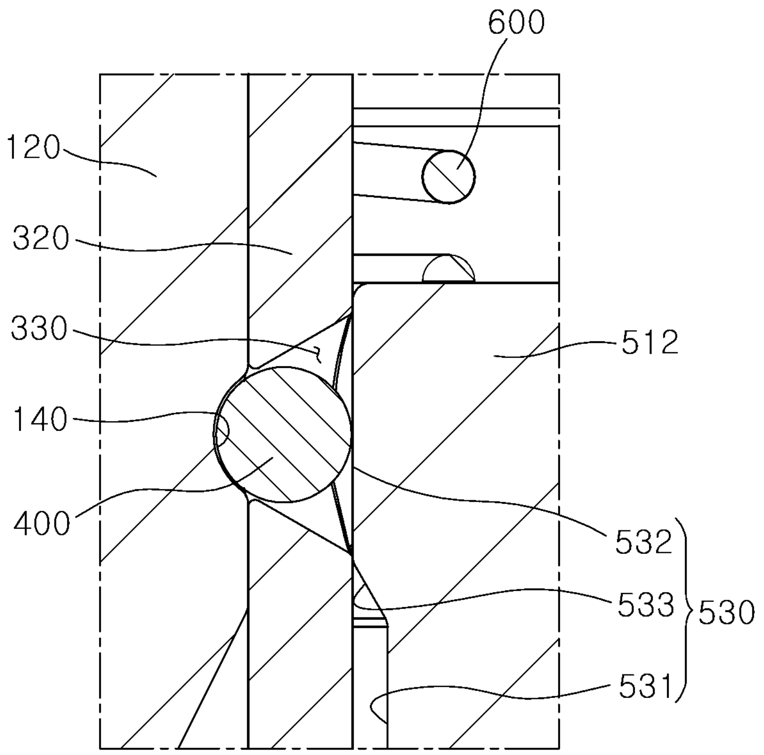
FIG. 9 is a diagram illustrating the state in which the fixing unit according to the first embodiment of the present disclosure has been disposed at a second location.

FIG. 8 is a diagram illustrating the state in which the fixing unit according to the first embodiment of the present disclosure has been disposed at the first location. FIG. 9 is a diagram illustrating the state in which the fixing unit according to the first embodiment of the present disclosure has been disposed at the second location.

Referring to FIG. 8, the state in which the fixing unit 400 has been disposed at the first location may be exemplified as the state in which as the fixing unit 400 is moved to the outside of the second body 320 in the radial direction thereof, the circumferential surface of the fixing unit 400 has been separated from the trapping part 140 and has not protruded into the internal space of the second body 320. In this case, the first body 120 may be relatively moved up and down with respect to the second body 320 within the second body 320 without particular interference.

Referring to FIG. 8, the state in which the fixing unit 400 has been disposed at the second location may be exemplified as the state in which as the fixing unit 400 is moved toward the inside of the second body 320 in the radial direction thereof, the circumferential surface of the fixing unit 400 has protruded into the internal space of the second body 320 and has been inserted into the trapping part 140. In this case, a relative movement of the first body 120 with respect to the second body 320 is confined by a trapping force of the trapping part 140 and the fixing unit 400.

Figure 14:
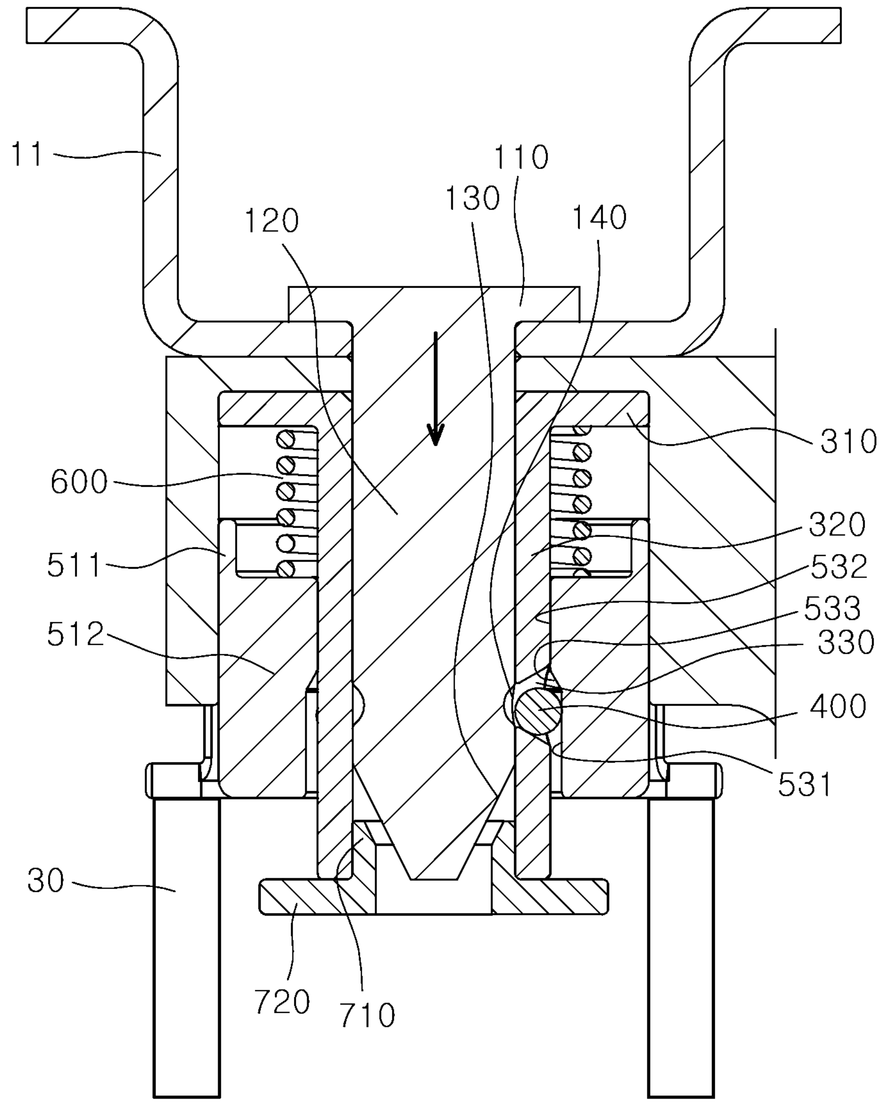

The elevation unit 500 is installed in the case 200 in a way to be movable up and down, and is moved up and down by an external force that is applied by a work tool 30 (refer to FIG. 14). The elevation unit 500 adjusts the direction in which the fixing unit 400 is moved.

Figure 10A:
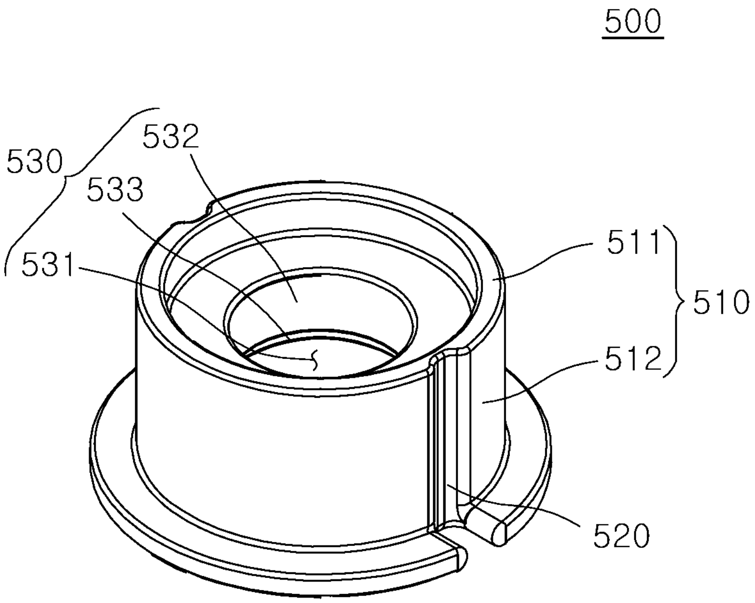
FIGS. 10A and 10B are a perspective view schematically illustrating a construction of an elevation unit according to the first embodiment of the present disclosure.
Figure 10B:
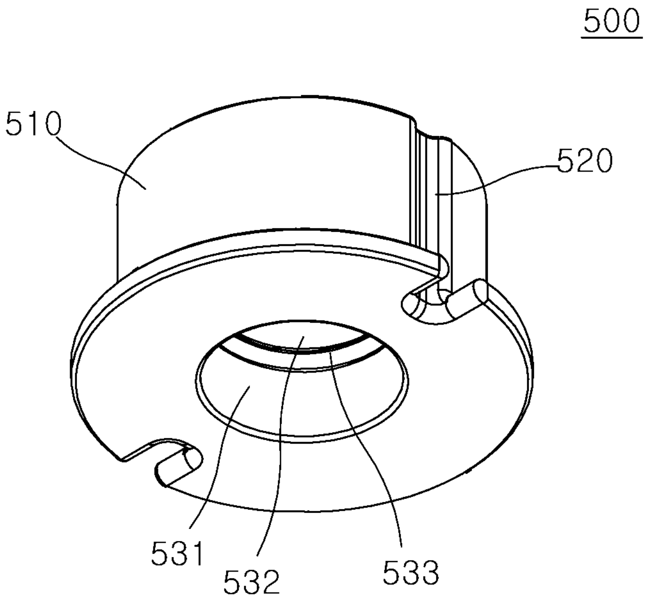

FIGS. 10A and 10B are is a perspective view schematically illustrating a construction of the elevation unit according to the first embodiment of the present disclosure.

The elevation unit 500 according to the present disclosure includes an elevation member 510, an elevation guide member 520, and a guide member 530.

The elevation member 510 is disposed to surround the second fastener 300, and is installed in a way to be slidable in a length direction of the second fastener 300.

The elevation member 510 according to the present disclosure includes a first elevation member 511 and a second elevation member 512.

The first elevation member 511 is formed to have a hollow cylindrical shape and is installed between the case 200 and the second body 320. The outer circumference surface of the first elevation member 511 comes into contact with the inner circumference surface of the case 200 in a way to be slidable. The inner circumference surface of the first elevation member 511 is disposed to face the outer circumference surface of the second body 320 in a way to be spaced apart from the outer circumference surface of the second body 320 at a designated interval.

The second elevation member 512 is formed to have a hollow cylindrical shape, and is perpendicularly extended downward from the lower end of the first elevation member 511. The outer circumference surface of the second elevation member 512 comes into contact with the inner circumference surface of the case 200 in a way to be slidable. The diameter of the inner circumference surface of the second elevation member 512 is formed to be smaller than the diameter of the inner circumference surface of the first elevation member 511. Accordingly, the second elevation member 512 may provide a space in which the bottom of a restoration unit 600 that is described later may be seated at the top of the second elevation member 512. The inner circumference surface of the second elevation member 512 is disposed to face the outer circumference surface of the second body 320 in a way to be spaced apart from the outer circumference surface of the second body 320 at a designated interval.

The elevation guide member 520 may be formed to have a form of a groove that is concavely depressed from the outer circumference surface of the elevation member 510 toward the inside of the elevation member 510 in the radial direction thereof. The length direction of the elevation guide member 520 is extended in parallel to the length direction of the elevation member 510. The rail part 210 that is formed in the case 200 is seated in the elevation guide member 520. Accordingly, the elevation guide member 520 provides guidance to an elevation operation of the elevation member 510 with respect to the case 200, and prevents the elevation member 510 from being arbitrarily rotated within the case 200. The elevation guide member 520 is provided in a plural number. The plurality of elevation guide members 520 is disposed in the circumferential direction of the elevation member 510 in a way to be spaced apart from each other at designated intervals. The number of elevation guide members 520 and an interval between the elevation guide members 520 correspond to the number of rail parts 210 and an interval between the rail parts 210, respectively.

The guide member 530 is provided between the elevation member 510 and the second fastener 300. The guide member 530 provides guidance to a movement of the fixing unit 400 while operating in conjunction with an elevation movement of the elevation member 510. That is, the guide member 530 changes a location of the fixing unit 400 from the first location to the second location or from the second location to the first location in response to an elevation movement direction of the elevation member 510.

Figure 11:
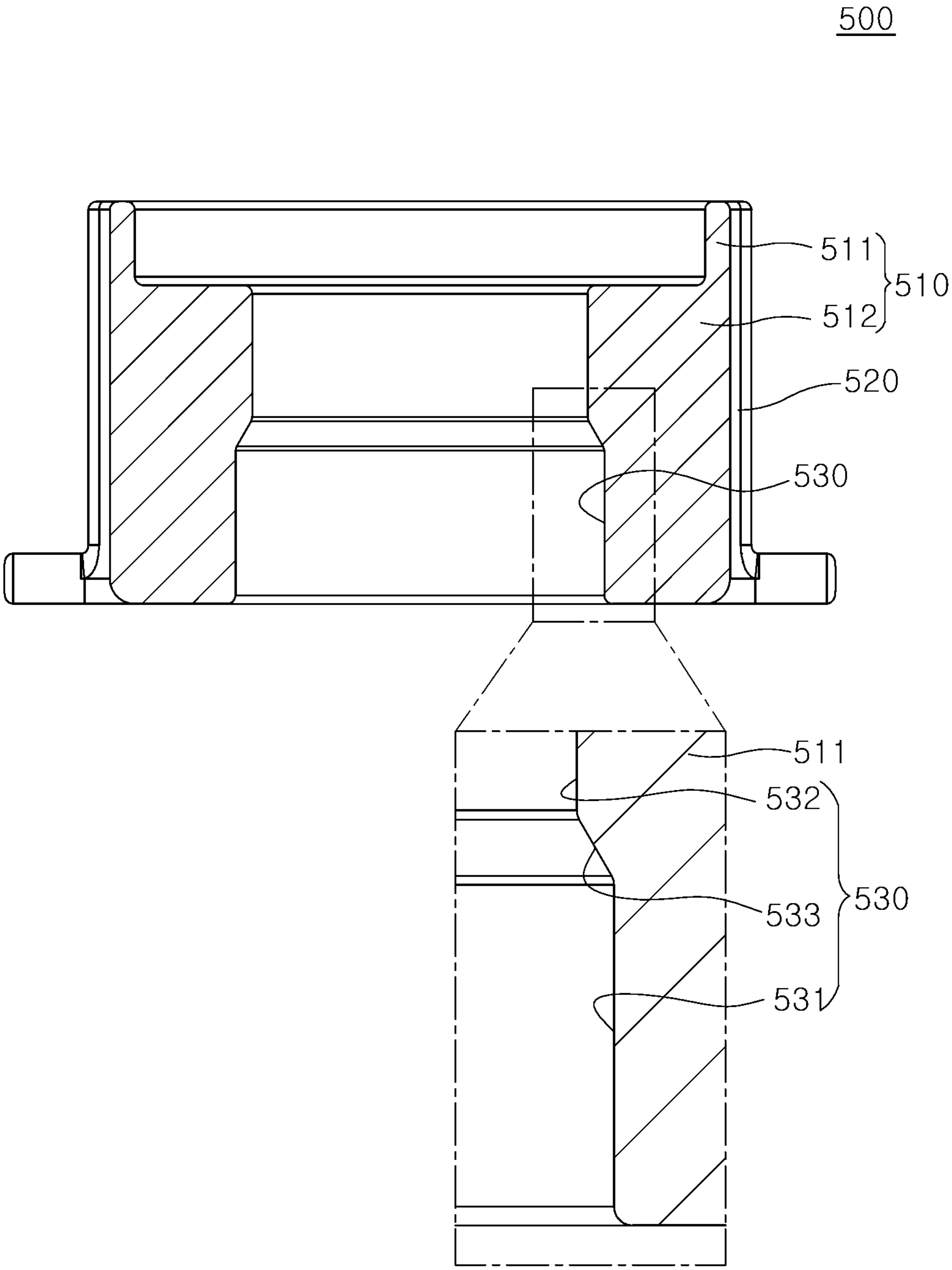
FIG. 11 is an enlarged view schematically illustrating a construction of a guide member according to the first embodiment of the present disclosure.

FIG. 11 is an enlarged view schematically illustrating a construction of the guide member according to the first embodiment of the present disclosure.

The guide member 530 according to the present disclosure includes a first guide member 531, a second guide member 532, and a third guide member 533.

The first guide member 531 is concavely depressed from the inner side of the elevation member 510, and disposes the fixing unit 400 at the first location. The first guide member 531 according to the present disclosure is concavely depressed from the inner circumference surface of the lower end of the second elevation member 512 to the outside of the second elevation member 512 in the radial direction thereof. The first guide member 531 is spaced apart from the outer circumference surface of the second body 320 at a designated interval. The first guide member 531 is extended in the circumferential direction of the second elevation member

512 in a way to form a looped curve. If the elevation member 510 has been upward fully moved, the first guide member 531 is disposed to face the accommodation part 330 and provides guidance to the fixing unit 400 so that the fixing unit 400 is disposed at the first location.

The second guide member 532 protrudes from the inner side of the elevation member 510 and disposes the fixing unit 400 at the second location. The second guide member 532 according to the present disclosure transversely protrudes from the inner circumference surface of the top of the second elevation member 512 toward the inside of the second elevation member 512 in the radial direction thereof. The second guide member 532 may come into contact with the outer circumference surface of the second body 320 in a way to be slidable. The second guide member 532 is extended in the circumferential direction of the second elevation member 512 in a way to form a looped curve. If the elevation member 510 has been fully downward moved, the second guide member 532 is disposed to face the accommodation part 330 and provides guidance to the fixing unit 400 so that the fixing unit 400 is disposed at the second location.

The third guide member 533 is provided between the first guide member 531 and the second guide member 532, and provides guidance to the fixing unit 400 so that the fixing unit 400 is moved from any one of the first location and the second location to the other of the first location and the second location. The third guide member 533 according to the present disclosure may be formed to have a form of a curved surface both ends of which are connected to the top of the first guide member 531 and the bottom of the second guide member 532, respectively. The third guide member 533 is rounded with designated curvature. In this case, the curvature of the third guide member 533 may be formed to correspond to curvature of the fixing unit 400. Accordingly, the third guide member 533 can prevent a trapping phenomenon which may occur in a process in which the location of the fixing unit 400 is changed due to a difference between the diameters of the first guide member 531 and the second guide member 532.

The restoration unit 600 restores the elevation unit 500 to an initial location thereof as an external force that is applied from the work tool 30 to the elevation unit 500 is released. In this case, the initial location of the elevation unit 500 may mean the state in which the elevation unit 500 has descended to the maximum within the case 200 and has come into contact with a detachment prevention unit 700 that is described later. Accordingly, the restoration unit 600 can secure consistent assembly performance when the first fastener 100 and the second fastener 300 are repeatedly fastened.

Figure 12:
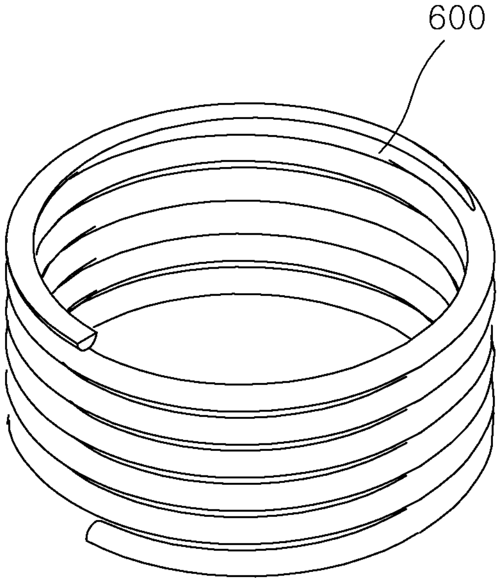
FIG. 12 is a perspective view schematically illustrating a construction of a restoration unit according to the first embodiment of the present disclosure.

FIG. 12 is a perspective view schematically illustrating a construction of the restoration unit according to the first embodiment of the present disclosure.

Referring to FIGS. 3 and 12, the restoration unit 600 according to the present disclosure is installed between the case 200 and the elevation unit 500. The restoration unit 600 is formed to have a form of a coil spring that is provided in a way to be stretchable in a length direction thereof, and elastically supports the elevation unit 500 with respect to the case 200. The length direction of the restoration unit 600 is parallel to the length direction of the case 200. If the elevation unit 500 is disposed at its initial location, the restoration unit 600 may be installed in its neutral state so that an elastic force is not generated in the length direction thereof.

Both ends of the restoration unit 600 come into surface contact with the case 200 and the elevation unit 500, respectively, and are supported by the case 200 and the elevation unit 500. More specifically, each of the both ends of the restoration unit 600 is formed to have a semicircle-shaped cross-section form, and the both ends of the restoration unit 600 come into surface contact with the lower side of the top of the case 200 and the top of the second elevation member 512. Accordingly, the restoration unit 600 can stably maintain a standing state without a special movement between the case 200 and the elevation unit 500 even without separate support means.

The detachment prevention unit 700 is coupled to the second fastener 300, and prevents the elevation unit 500 from being detached from the case 200. The detachment prevention unit 700 according to the present disclosure may include a coupling part 710 that is formed in a hollow cylindrical shape and that has an outer circumference surface screwed onto the inner circumference surface of the bottom of the second body 320 and a detachment prevention member 720 that is extended from the bottom of the coupling part 710 in the radial direction of the coupling part 710 and that is disposed to face the bottom of the elevation member 510. If the elevation member 510 has been disposed at its initial location, the detachment prevention member 720 comes into contact with the bottom of the elevation member 510 and supports the elevation member 510. Accordingly, the detachment prevention unit 700 limits the elevation unit 500 so that the elevation unit 500 is not arbitrarily separated from the case 200 due to the elastic force of the restoration unit 600. Accordingly, a loss of a part can be prevented, and a repair and replacement can be easily performed.

Hereinafter, an operation of the fastening apparatus 1 for a vehicle according to the first embodiment of the present disclosure is described in detail.

Figure 13:
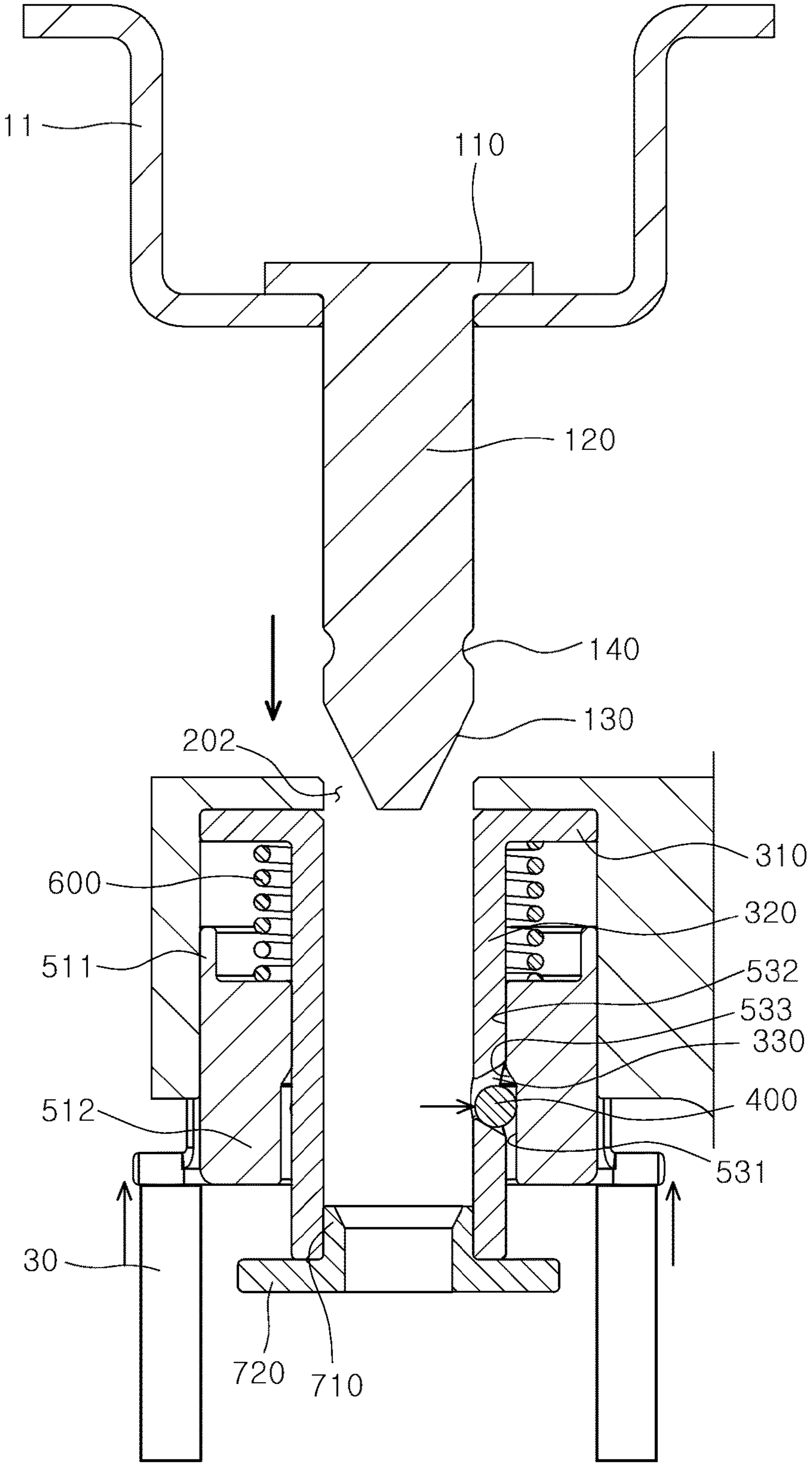
FIGS. 13 to 15 are diagrams schematically illustrating an assembly process of the fastening apparatus for a vehicle according to the first embodiment of the present disclosure.
Figure 15:
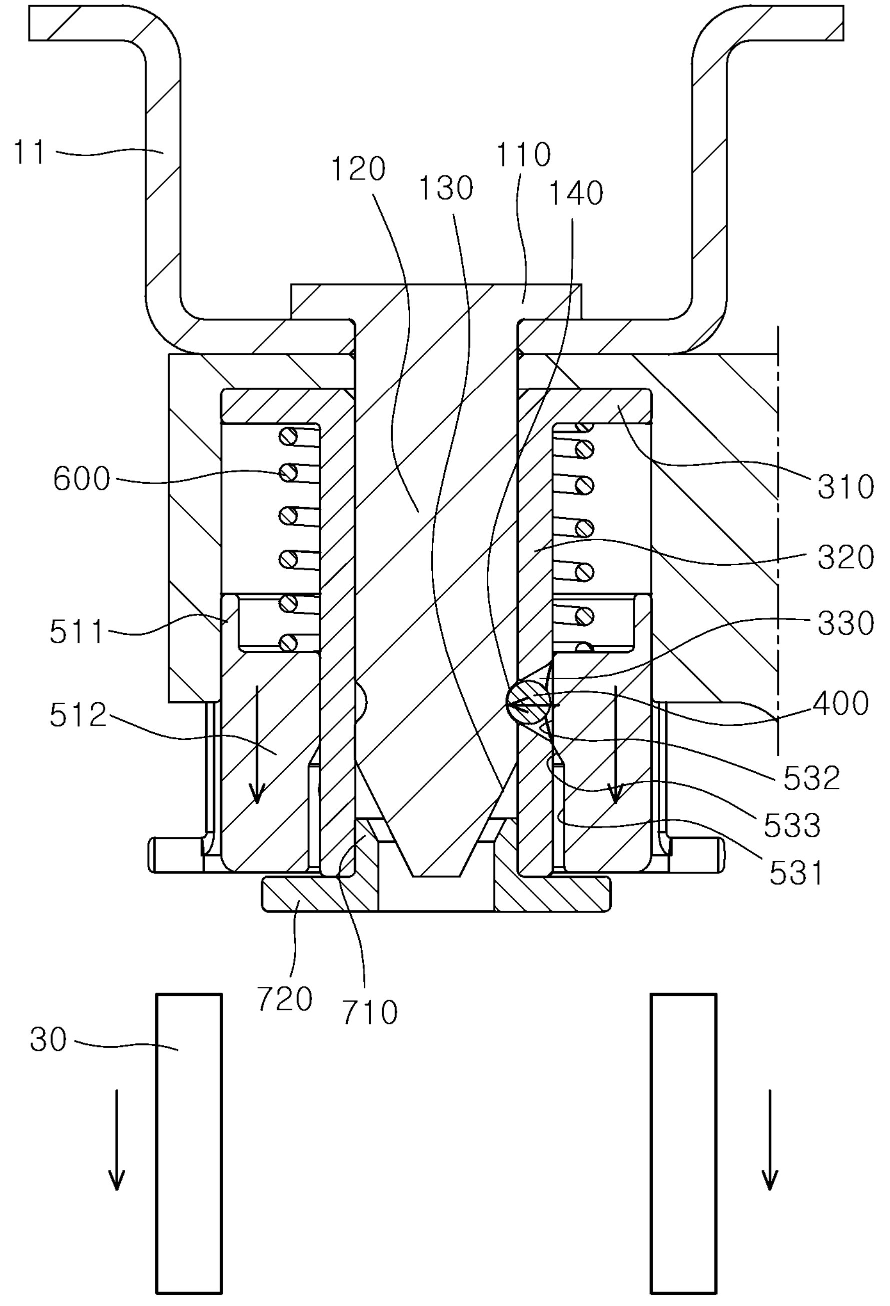

FIGS. 13 to 15 are diagrams schematically illustrating an assembly process of the fastening apparatus for a vehicle according to the first embodiment of the present disclosure.

Referring to FIGS. 11 to 15, as the first structure 10 is seated on the top of the second structure 20, the first fastener 100 fixed to the first structure 10 is inserted into the second fastener 300 through the insertion hole part 202.

At this time, the elevation member 510 is disposed at its initial location by the elastic force of the restoration unit 600. The fixing unit 400 is disposed at the second location by the second guide member 532, and thus maintains the state in which the circumferential surface of the fixing unit 400 has protruded into the internal space of the second body 320.

Thereafter, the work tool 30 comes into contact with the bottom of the second elevation member 512 and upward pushes up the elevation member 510.

As the elevation member 510 is upward moved by a designated distance or more, the contact of the fixing unit 400 with the second guide member 532 is released, and the fixing unit 400 is disposed to face the first guide member 531.

The fixing unit 400 whose contact with the second guide member 532 has been released moves to the outside in the radial direction of the second body 320 along the inner side of the accommodation part 330 by its own weight, and is then disposed at the first location.

As the fixing unit 400 is disposed at the first location, the fixing unit 400 opens the path along which the first body 120 is inserted into the second body 320. At this time, the fixing unit 400 can be prevented from be detached from the accommodation part 330 because the circumferential surface of the fixing unit 400 comes into contact with the inner side of the first guide member 531.

Thereafter, the first body 120 continues to be inserted into a point at which the trapping part 140 is connected to the accommodation part 330.

As the trapping part 140 is connected to the accommodation part 330, the work tool 30 is separated from the second elevation member 512 and thus releases the external force that is applied to the elevation member 510.

The elevation member 510 is downward moved by its own weight and the elastic restoring force of the restoration unit 600, and returns to its initial location. At this time, the elevation member 510 can be prevented from being detached from the case 200 because the bottom of the second elevation member 512 comes into contact with the top of the detachment prevention member 720 at the initial location of the elevation member 510.

As the elevation member 510 is downward moved, the fixing unit 400 that has come into contact with the inner side of the first guide member 531 is inward moved in the radial direction of the second body 320 by the third guide member 533. In this case, since the third guide member 533 is rounded with designated curvature, the fixing unit 400 may be inward smoothly moved in the radial direction of the second body 320 without particular interference. Thereafter, the fixing unit 400 is disposed at the second location by the second guide member 532, and a part of the circumferential surface of the fixing unit 400 protrudes into the internal space of the second body 320.

The circumferential surface of the fixing unit 400 that has protruded into the internal space of the second body 320 is inserted into the trapping part 140, and limits relative movements of the first fastener 100 and the second fastener 300.

An operation of the first fastener 100 and the second fastener 300 being separated from each other may be performed in the reverse order of the operation of the first fastener 100 and the second fastener 300 being assembled.

Hereinafter, a fastening apparatus 1' for a vehicle according to a second embodiment of the present disclosure is described.

Figure 16:
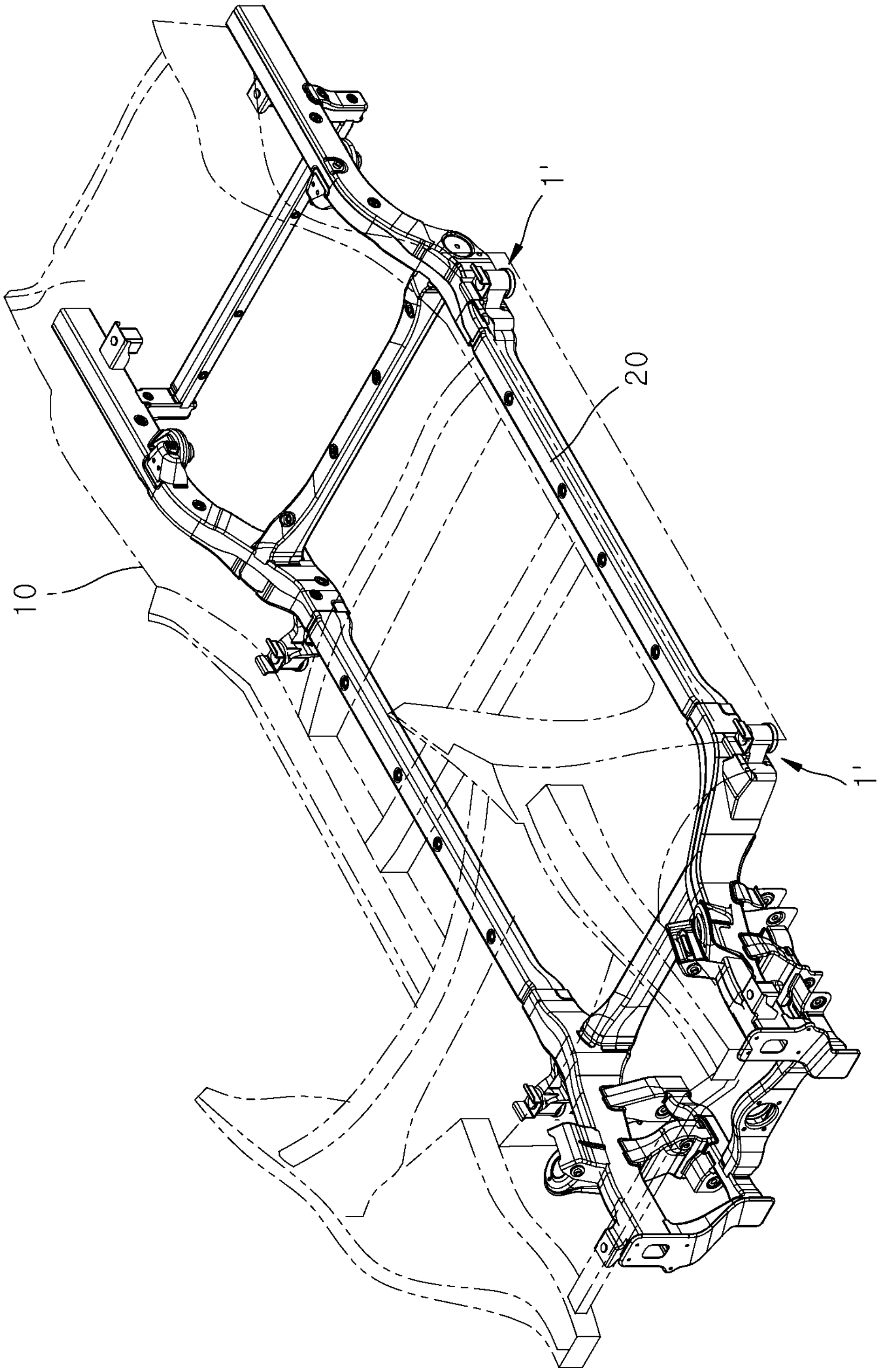
FIG. 16 is a perspective view illustrating the state in which a fastening apparatus for a vehicle according to a second embodiment of the present disclosure has been installed.
Figure 17:
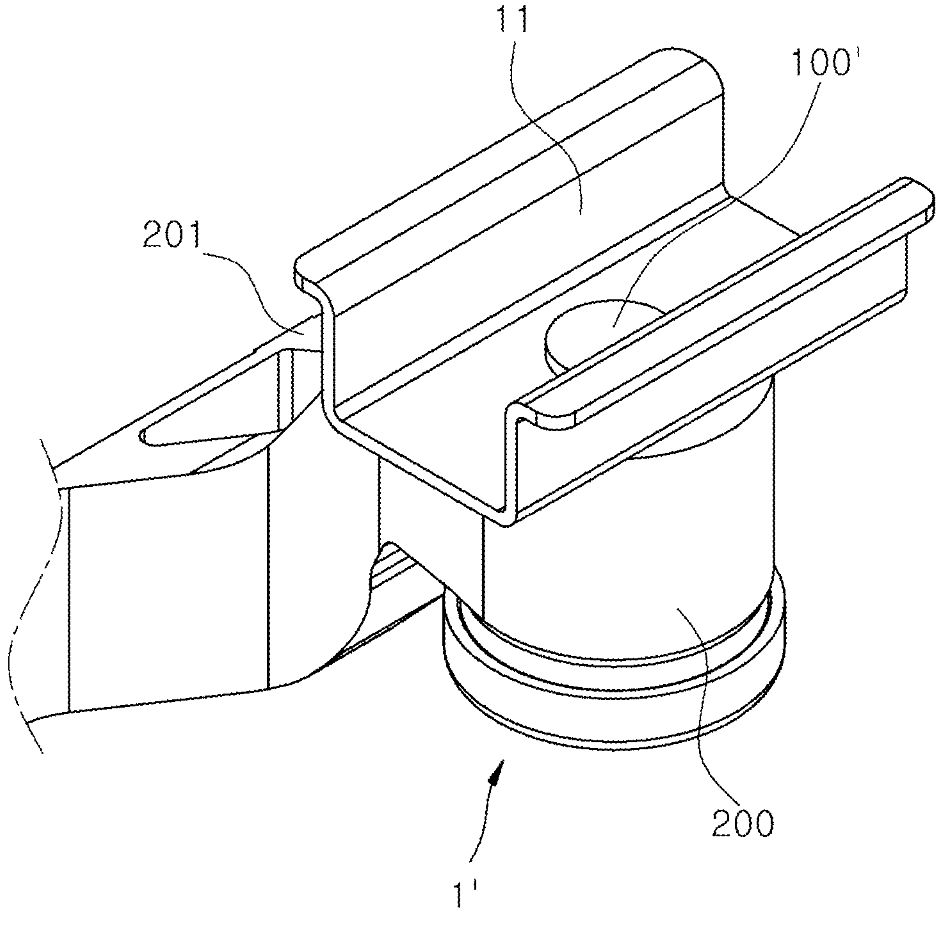
FIG. 17 is a perspective view illustrating the fastening apparatus for a vehicle according to the second embodiment of the present disclosure.
Figure 18:
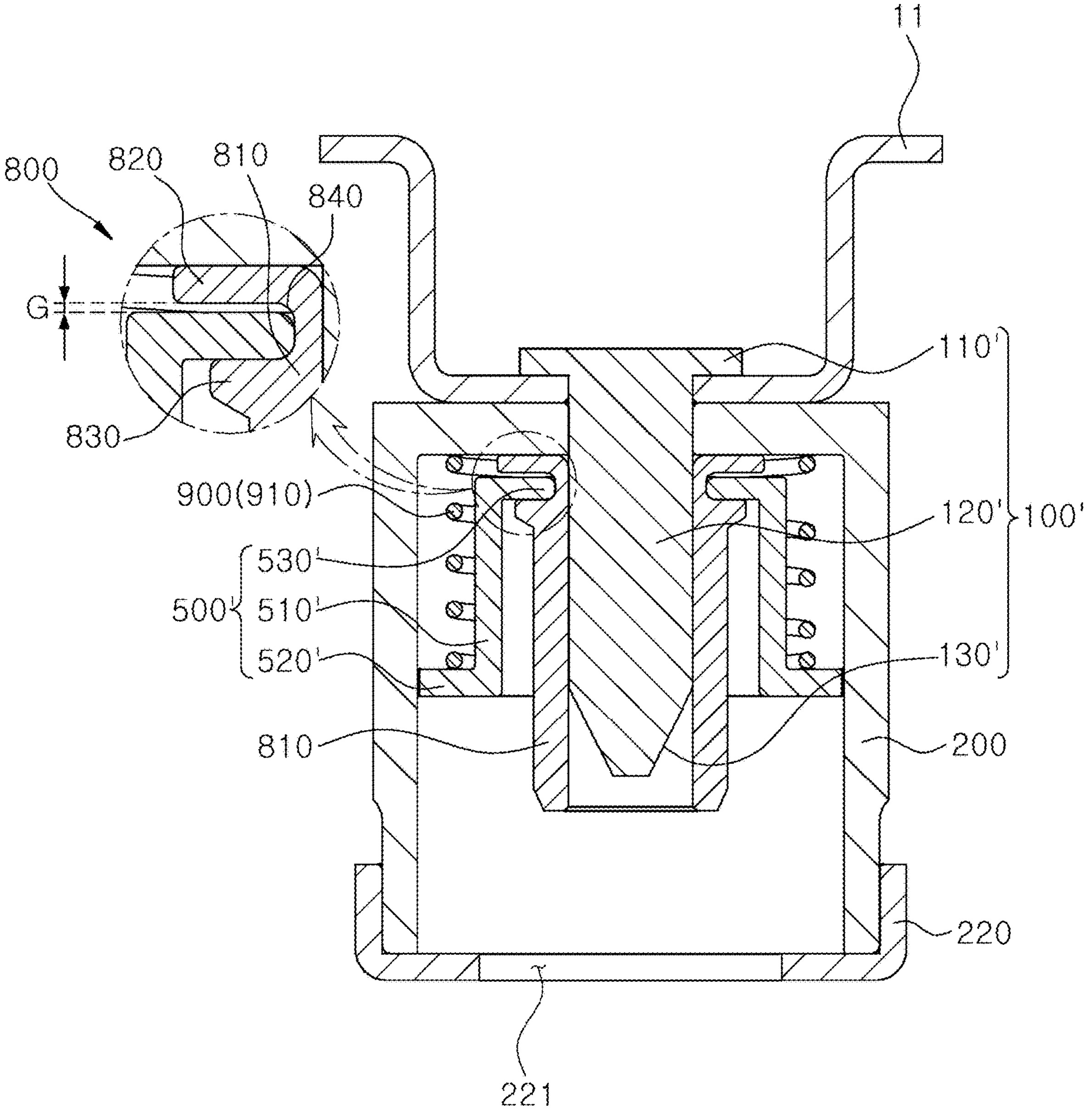
FIG. 18 is a cross-sectional view illustrating the fastening apparatus for a vehicle according to the second embodiment of the present disclosure.
Figure 19:
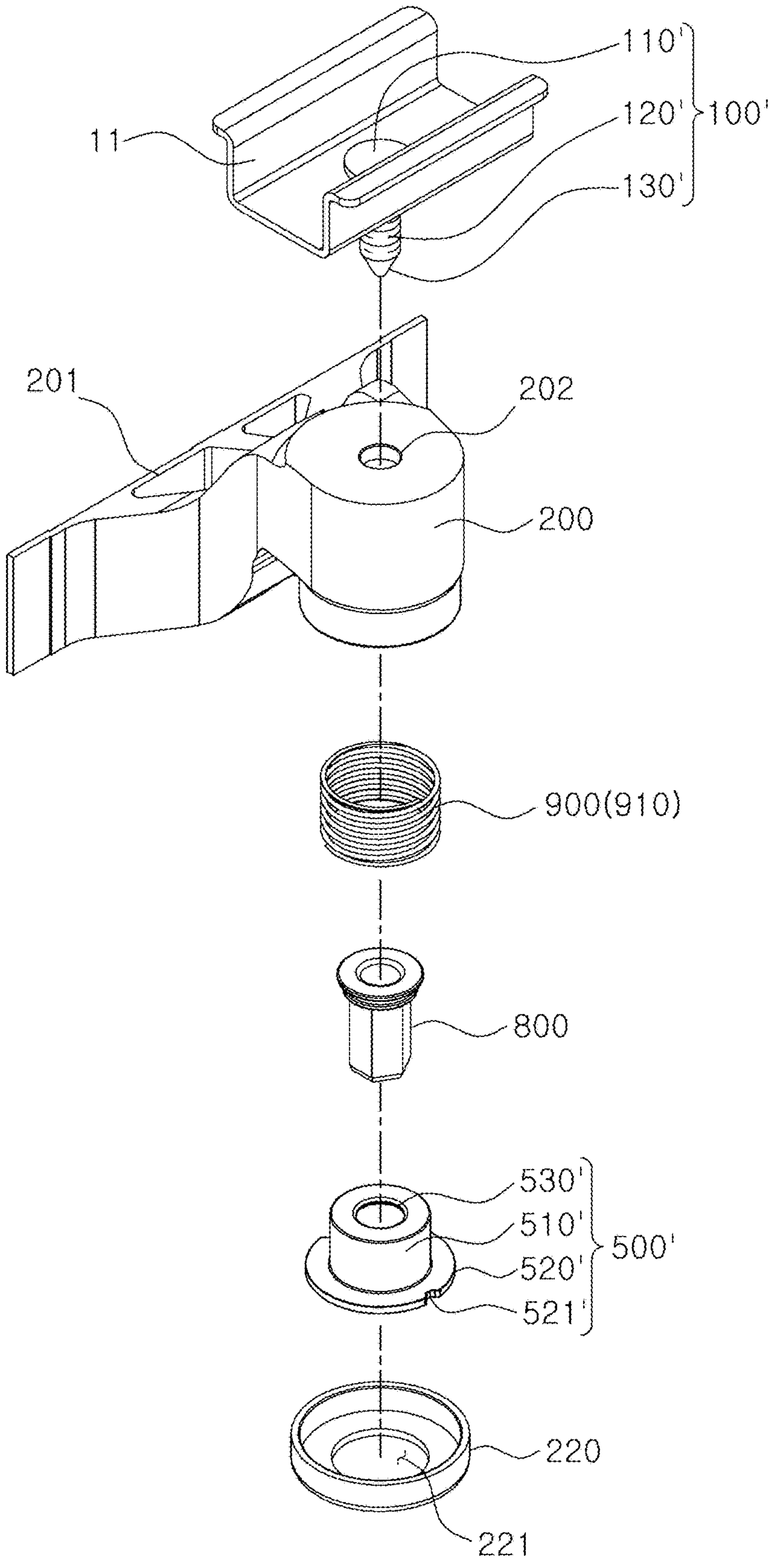
FIG. 19 is an exploded perspective view illustrating the fastening apparatus for a vehicle according to the second embodiment of the present disclosure.

FIG. 16 is a perspective view illustrating the state in which a fastening apparatus for a vehicle according to a second embodiment of the present disclosure has been installed. FIG. 17 is a perspective view illustrating the fastening apparatus for a vehicle according to the second embodiment of the present disclosure. FIG. 18 is a cross-sectional view illustrating the fastening apparatus for a vehicle according to the second embodiment of the present disclosure. FIG. 19 is an exploded perspective view illustrating the fastening apparatus for a vehicle according to the second embodiment of the present disclosure.

Referring to FIGS. 16 to 19, the fastening apparatus 1' for a vehicle according to the present embodiment is constituted with components that include a first fastener 100', a case 200, an elevation unit 500', a second fastener 800, and a restoration unit 900, which are described in detail as follows.

A first structure 10 and a second structure 20 that are described hereinafter may be exemplified as a top hat corresponding to a vehicle body which can be customized and replaced depending on a user's purpose and a chassis frame that is installed on the lower side of a vehicle and that structurally supports the vehicle, respectively. However, the first structure 10 and the second structure 20 are not limited to the top hat and the chassis frame, and may be variously changed in design as different structures which may be fastened together and separated from each other in a vehicle, such as a chassis frame and a battery module.

The first fastener 100' is fixed to the first structure 10 and is fastened to the second fastener 800, and it mutually fixes the second structure 20 and the first structure 10.

Figure 20:
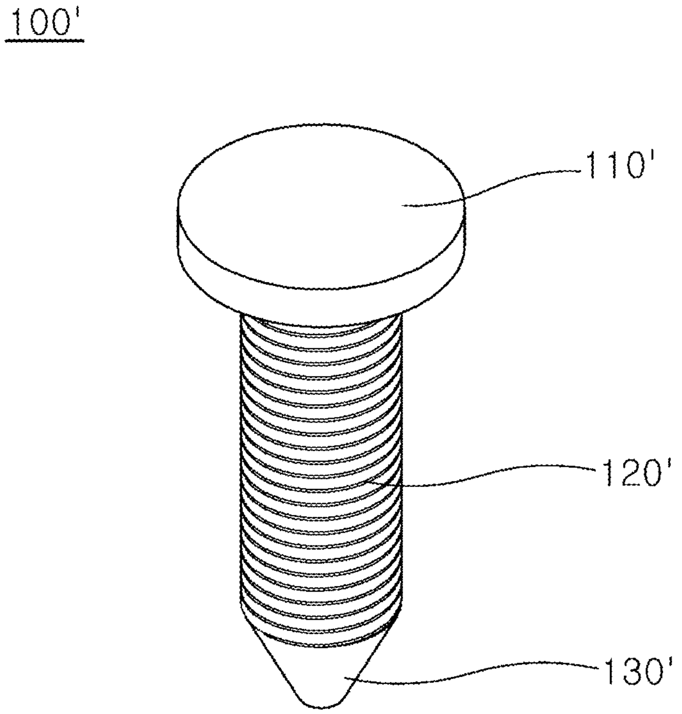
FIG. 20 is a perspective view illustrating a first fastener in the fastening apparatus for a vehicle according to the second embodiment of the present disclosure.

FIG. 20 is a perspective view illustrating the first fastener in the fastening apparatus for a vehicle according to the second embodiment of the present disclosure.

Referring to FIG. 20, the first fastener 100' may include a fixing part 110', an extension part 120', and an entry guider 130'.

The fixing part 110' forms an external appearance of the top of the first fastener 100', and generally supports the extension part 120' and the entry guider 130'. The fixing part 110' is seated and fixed to the inner side of a bracket part 11 that is coupled to the first structure 10. The fixing part 110' may be welded or bonded to the inner side of the bracket part 11 and integrally coupled to the bracket part 11. A detailed shape of the fixing part 110' may be changed in design in various forms which may be seated and fixed to the inner side of the bracket part 11, in addition to the circular shape illustrated in FIGS. 19 and 20.

The extension part 120' is extended from the fixing part 110', and forms an external appearance of a central part of the first fastener 100'. The extension part 120' may be formed to have a form of a rod that is perpendicularly extended downward from the inner side of the fixing part 110'. The extension part 120' penetrates the inner side of the bracket part 11, and is extended downward from the bracket part 11. The extension part 120' has a screw thread formed on an outer circumference surface thereof in a length direction thereof so that the extension part 120' can be spirally coupled to the second fastener 800.

The entry guider 130' is extended from the extension part 120', and forms an external appearance of a lower part of the first fastener 100'. The entry guider 130' is provided to provide guidance to the extension part 120' so that the extension part 120' enters the inside of the second fastener 800 in a process of the first fastener 100' and the second fastener 800 being fastened together. The entry guider 130' is perpendicularly extended downward from the lower end of extension part 120'. The entry guider 130' is formed so that the width of the entry guider 130' is reduced toward an end thereof. Accordingly, the entry guider 130' may be formed to have approximately a shape of a cone.

The case 200 is fixed to the second structure 20, and is disposed to face the first fastener 100'. The case 200 generally supports the elevation unit 500' and the restoration unit 900.

The case 200 is provided in a way that the first fastener 100' is inserted into the case 200 through the top of the case 200 so that a fastening operation of the first fastener 100' and the second fastener 800 is performed within the case 200 and that a work tool 30, such as a socket wrench, can enter the bottom of the case 200.

Figure 21:
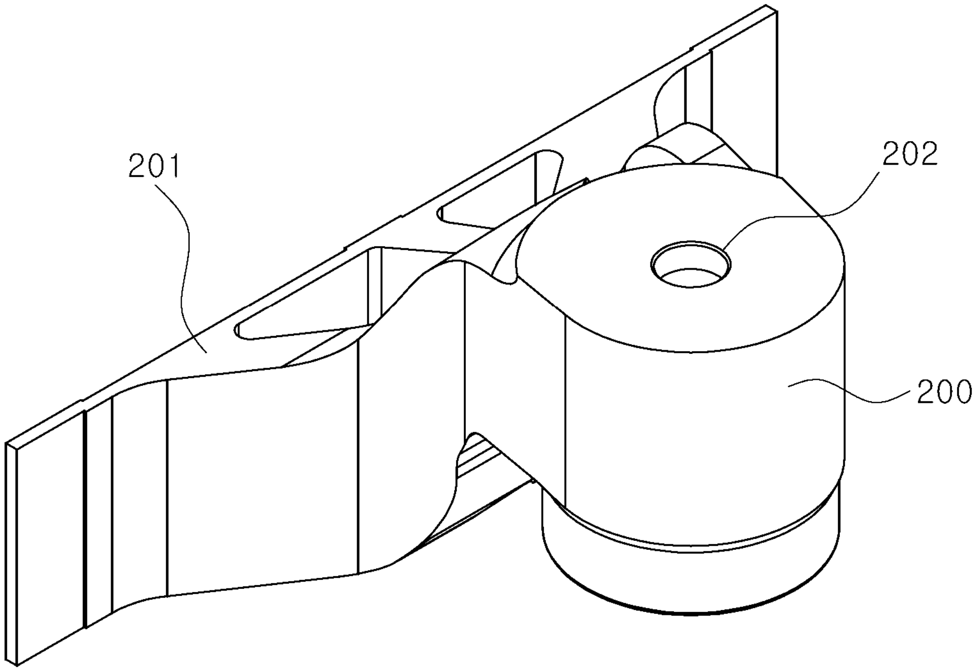
FIGS. 21 and 22 are exploded perspective views illustrating a case in the fastening apparatus for a vehicle according to the second embodiment of the present disclosure.
Figure 22:
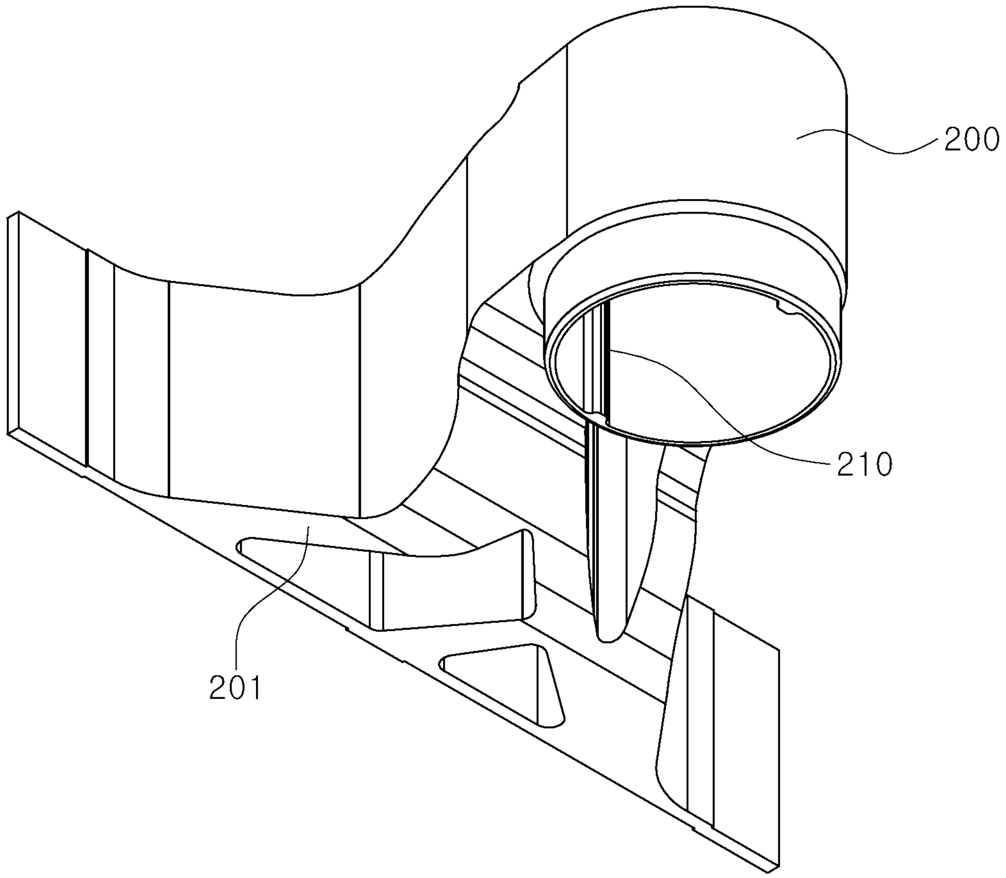

FIGS. 21 and 22 are exploded perspective views illustrating the case in the fastening apparatus for a vehicle according to the second embodiment of the present disclosure.

Referring to FIGS. 19 to 22, the case 200 may have an empty inside, and may be formed to have a cylindrical shape the bottom of which is opened. The length direction of the case 200 is parallel to the length direction of the first fastener 100'. The case 200 may be supported against the second structure 20 through the medium of an assembly part 201 that is extended from the side of the case 200. In this case, the assembly part 201 may be integrally coupled to the second structure 20 by welding, bonding, etc. and may be detachably coupled to the second structure 20 by bolting, etc.

The top of the case 200 is disposed to face an end of the first fastener 100' fixed to the first structure 10, that is, the bottom of the entry guider 130'. An insertion hole part 202 into which the first fastener 100' is inserted is formed at the top of the case 200. The insertion hole part 202 may be formed to have a form of a hole that perpendicularly penetrates the top of the case 200 up and down. The insertion hole part 202 may be formed to have a diameter greater than the diameter of the extension part 120' so that an operation of the first fastener 100' being inserted into the insertion hole part 202 is smoothly performed.

A rail part 210 may be formed within the case 200. The rail part 210 perpendicularly protrudes from the inner circumference surface of the case 200 toward an internal space of the case 200. However, the rail part 210 is not limited to such a shape, and may be formed in the form of a groove that is concavely depressed from the inner circumference surface of the case 200 toward the outer circumference surface of the case 200 depending on a shape of an elevation guide member 521' that is provided in the elevation unit 500'. The length direction of the rail part 210 extends in a direction parallel to the length direction of the case 200. The rail part 210 may be provided in a plural number. In this case, the plurality of rail parts 210 may be spaced apart from each other and disposed along the inner circumference surface of the case 200.

A stopper 220 for preventing the elevation unit 500' and the restoration unit 900 from deviating from the inside of the case 200 may be provided at the bottom of the case 200. The stopper 220 may be formed to have a form of a plate that is transversely extended from an edge of the bottom of the case 200 toward a central axis of the case 200. The stopper 220 may be integrally formed with the case 200, and may be fabricated separately from the case 200 and connected to the case 200 in a way to be separable from the case 200 as illustrated in FIGS. 18 and 19. A tool hole part 221 that is formed to perpendicularly penetrate the stopper 220 up and down so that the work tool 30, such as a motor drill or a socket wrench, can enter the tool hole part 221 is formed at the central part of the stopper 220.

The elevation unit 500' is installed within the case 200 in a way to move up and down. The elevation unit 500' functions to align the second fastener 800 to its regular location within the case 200 and also to provide guidance to a movement of the second fastener 800 in a process of the first fastener 100' and the second fastener 800 being fastened together.

Figure 23:
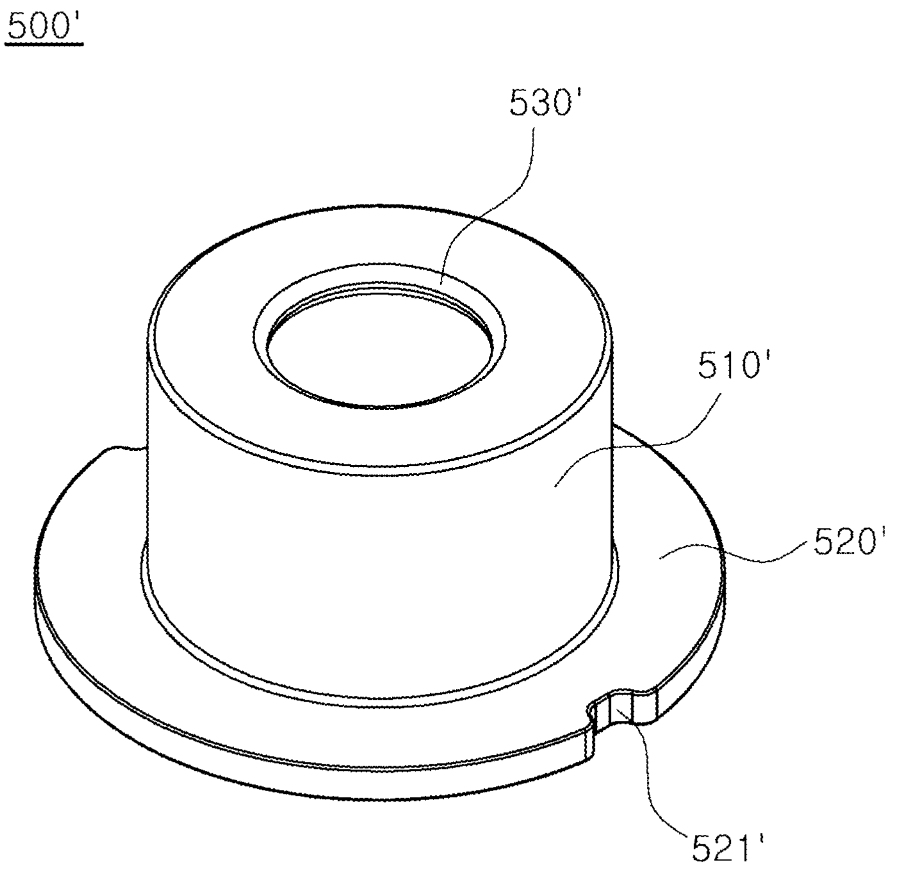
FIG. 23 is a perspective view illustrating an elevation unit in the fastening apparatus for a vehicle according to the second embodiment of the present disclosure.

FIG. 23 is a perspective view illustrating the elevation unit in the fastening apparatus for a vehicle according to the second embodiment of the present disclosure.

Referring to FIGS. 16 to 23, the elevation unit 500' may include an elevation member 510', a flange member 520', and a support member 530'.

The elevation member 510' forms a schematic external appearance of the elevation unit 500', and is installed within the case 200 in a way to move up and down. The elevation member 510' is formed to have a hollow cylindrical shape both sides of which have been opened, and is installed within the case 200. An outer circumference surface of the elevation member 510' is spaced apart from the inner circumference surface of the case 200 at a given interval so that the elevation member 510' can smoothly move up and down within the case 200 and also provide a space where the flange member 520' and the restoration unit 900 to be described later may be installed.

The flange member 520' is extended from the outer circumference surface of the elevation member 510', and is connected to the rail part 210 provided on the inner circumference surface of the case 200 in a way to be slidable. The flange member 520' may be formed to have a form of a circular plate that is transversely extended in the radial direction of the elevation member 510' from the outer circumference surface of the elevation member 510' at the bottom thereof. The flange member 520' is formed to have a greater diameter than the tool hole part 221. Accordingly, the flange member 520' can be prevented from deviating toward the outside of the case 200 because the inner side of the flange member 520' comes into contact with an upper side of the stopper 220, and the work tool 30 can be prevented from directly coming into contact with the restoration unit 900.

The flange member 520' is connected to the rail part 210 in a way to be slidable through the medium of an elevation guide member 521' formed in the outer circumference surface of the flange member 520'. The elevation guide member 521' may be formed to have a form of a groove that is concavely depressed from the outer circumference surface of the elevation member 510' toward the central axis of the elevation member 510'. The elevation guide member 521' is formed to have a cross section corresponding to a cross section of the rail part 210 that protrudes from the inner circumference surface of the case 200. The elevation guide member 521' is inserted into the rail part 210. The elevation guide member 521' slides in the length direction of the rail part 210, and supports the elevation member 510' against the case 200 so that the elevation member 510' moves up and down. However, the elevation guide member 521' is not limited to such a form. If the rail part 210 is formed to be depressed concavely from the inner circumference surface of the case 200, the elevation guide member 521' may be formed in a form that protrudes from the outer circumference surface of the elevation member 510'. The elevation guide member 521' may be provided in a plural number. The elevation guide members 521' may be spaced apart from each other at a given interval and disposed on the outer circumference surface of the elevation member 510'.

The support member 530' is extended from the inner circumference surface of the elevation member 510', and rotatably supports the second fastener 800. The support member 530' may be formed to have a form of a ring that transversely extends from the inner circumference surface of the elevation member 510' at the top thereof toward the inside of the elevation member 510' in the radial direction thereof. For the smooth rotation of the second fastener 800, a free end of the support member 530' may be rounded to the outside of the support member 530' so that the free end has given curvature. When the second fastener 800 rises to a maximum height thereof as the first fastener 100' and the second fastener 800 are fastened together, the support member 530' does not come into contact with the upper side of the case 200 on the inner side thereof so that rotatory power of the second fastener 800 is not transferred to the elevation unit 500'.

The second fastener 800 is rotatably coupled to the elevation unit 500'. The second fastener 800 is connected to the work tool 30 that enters the case 200 through the bottom of the case 200, and is rotated around a central axis thereof clockwise or counterclockwise by rotatory power that is applied by the work tool 30. The second fastener 800 is fastened to or separated from the first fastener 100' depending on a rotation direction thereof, and is moved up and down within the case 200 along with the elevation unit 500'. That is, the second fastener 800 is coupled to the elevation unit 500' so that the second fastener 800 can be integrally moved up and down along with the elevation unit 500' and also relatively rotated with respect to the elevation unit 500'.

Figure 24:
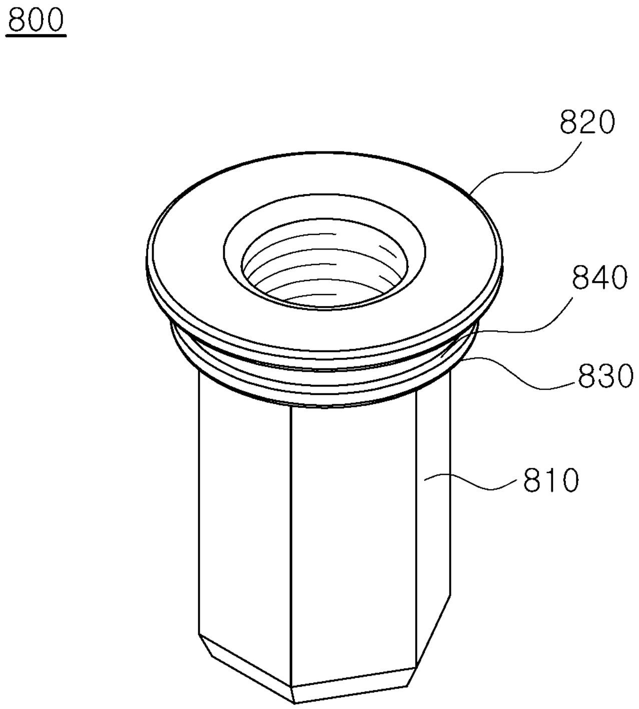
FIG. 24 is a perspective view illustrating a second fastener in the fastening apparatus for a vehicle according to the second embodiment of the present disclosure.

FIG. 24 is a perspective view illustrating the second fastener in the fastening apparatus for a vehicle according to the second embodiment of the present disclosure.

Referring to FIGS. 16 to 24, the second fastener 800 may include a second fastening member 810, a hook 820, a flange 830, and an insertion groove 840.

The second fastening member 810 is formed to have a hollow pole shape, and is inserted into the elevation member 510'. The second fastening member 810 is formed to have a smaller diameter than the elevation member 510'. An outer circumference surface of the second fastening member 810 is spaced apart from the inner circumference surface of the elevation member 510' at a given interval. Accordingly, the second fastening member 810 can be smoothly rotated within the elevation member 510' without particular interference. A screw thread that is screwed onto the outer circumference surface of the extension part 120' is provided on an inner circumference surface of the second fastening member 810. The second fastening member 810 is formed to have a length in which a bottom thereof can protrude downward from the elevation member 510'. Accordingly, the second fastening member 810 can improve the accessibility of the work tool 30.

The second fastening member 810 may be formed to have a polygon cross section. A cross section of the second fastening member 810 may be a hexagon. Accordingly, the second fastening member 810 can efficiently receive rotatory power from the work tool 30.

The hook 820 is extended from the second fastening member 810, and is provided over the support member 530'. The hook 820 is formed to be bent approximately in an L-shape from the top of the second fastening member 810 to the outside of the second fastening member 810 in a radial direction thereof. When the second fastening member 810 is rotated around a central axis thereof, a lower side of the hook 820 is disposed over the support member 530' so that the hook 820 is relatively rotated with respect to the support member 530'. For the smooth rotation of the second fastener 800, a gap G is formed between the support member 530' and the hook 820.

The flange 830 is extended from the second fastening member 810 and is provided under the support member 530'. The support member 530' is seated in the flange 830. Furthermore, the flange 830 prevents an up and down movement of the second fastening member 810 with respect to the elevation unit 500'. Accordingly, the second fastening member 810 can be supported in the state in which the second fastening member 810 is moved up and down integrally with the elevation member 510' and also relatively rotated with respect to the elevation member 510'.

The flange 830 is transversely extended from the outer circumference surface of the second fastening member 810 to the outside of the second fastening member 810 in the radial direction thereof. The flange 830 is spaced apart from the hook 820 at a given interval in the length direction of the second fastening member 810, and is disposed to face the hook 820. When the support member 530' is seated in the flange 830, the flange 830 is disposed to face a lower side of the support member 530' at the bottom thereof.

The insertion groove 840 is provided between the hook 820 and the flange 830. The support member 530' is inserted into the insertion groove 840. An inner side of the insertion groove 840 that comes into contact with the free end of the support member 530' may be formed to be round toward the inside of the insertion groove 840 so that the inner side has given curvature. A lubricant is applied on the inner side of the insertion groove 840. The gap G is formed between the support member 530' and the hook 820.

As the second fastening member 810 is rotated by the work tool 30, when the second fastening member 810 rises to a maximum height thereof, the hook 820 provided over the support member 530' comes into contact with the upper side of the case 200 on the inside thereof. The support member 530' inserted into the insertion groove 840 does not come into contact with the upper side of the case 200 on the inside thereof by the hook 820.

At this time, although the work tool 30 continues to rotate the second fastening member 810, the free end of the support member 530' that has been formed to be round toward the outside thereof so that the free end has given curvature comes into contact with the inner side of the insertion groove 840 that has been formed to be round toward the inside thereof so that the inner side has given curvature. A lubricant is applied on the inner side of the insertion groove 840. The gap G is formed between the support member 530' and the hook 820. Accordingly, the breakage of the support member 530' and the elevation member 510' can be prevented because rotatory power of the second fastening member 810 is not transferred to the elevation unit 500' and only the second fastening member 810 is smoothly rotated.

The restoration unit 900 restores the elevation unit 500' to its initial location as the second fastener 800 is separated from the first fastener 100'. The initial location of the elevation unit 500' may mean the state in which the elevation unit 500' has been lowered to the maximum extent within the case 200 and the lower side of the flange member 520' has been seated in the stopper 220. Accordingly, the restoration unit 900 can secure consistent assembly performance when the first fastener 100' and the second fastener 800 are repeatedly fastened together.

Figure 25:
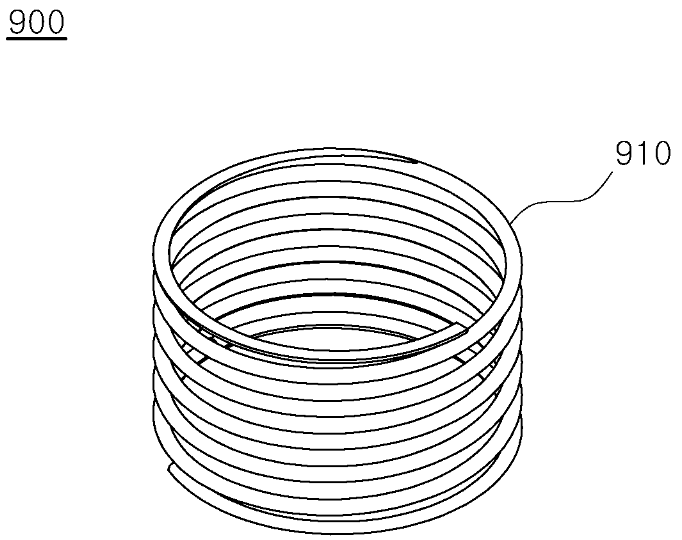
FIG. 25 is a perspective view illustrating a restoration unit in the fastening apparatus for a vehicle according to the second embodiment of the present disclosure.

FIG. 25 is a perspective view illustrating a restoration unit in the fastening apparatus for a vehicle according to the second embodiment of the present disclosure.

Referring to FIGS. 18 and 25, the restoration unit 900 may include an elastic member 910. The elastic member 910 is installed between the case 200 and the elevation unit 500'. The elastic member 910 is formed to have a form of a coil spring that is stretchably provided in a length direction thereof, and elastically supports the elevation unit 500' against the case 200. The length direction of the elastic member 910 is parallel to the length direction of the case 200. When the elevation unit 500' is placed at its initial location, the elastic member 910 may be installed in its neutral state so that an elastic force from the elastic member 910 is not generated in the length direction thereof.

Both ends of the elastic member 910 come into surface contact with the case 200 and the elevation unit 500', respectively, and are supported by the case 200 and the elevation unit 500'. More specifically, each of the both ends of the elastic member 910 is formed to have a semicircular cross-section form, and the both ends of the elastic member 910 come into surface contact with the lower side of the top of the case 200 and the upper side of the flange member 520'. Accordingly, the elastic member 910 can stably maintain a standing state without a special movement between the case 200 and the elevation unit 500' even without separate support means, A process of assembling the fastening apparatus for a vehicle having the aforementioned construction according to the second embodiment of the present disclosure is described as follows.

Figure 26:
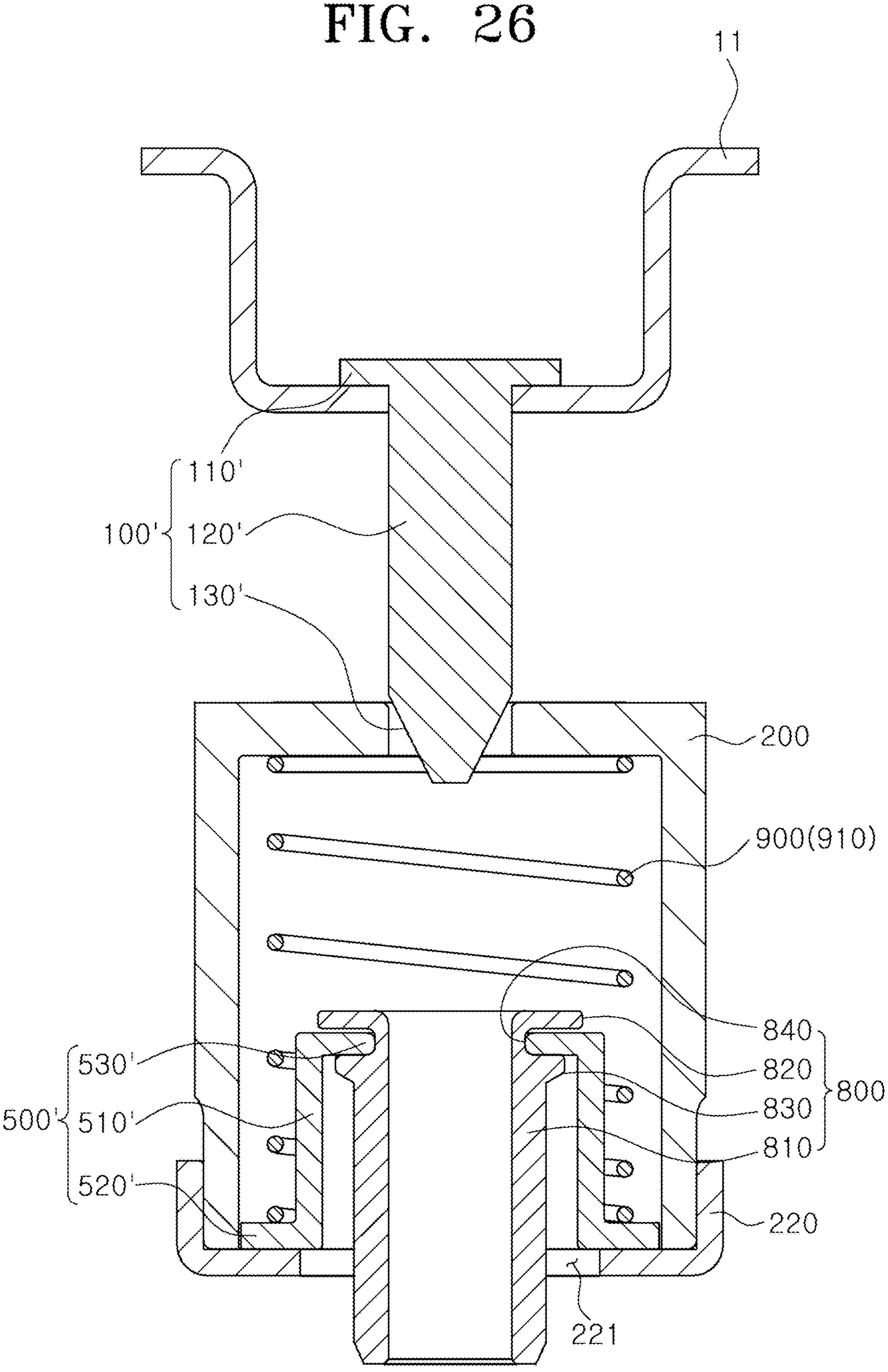
FIGS. 26 to 28 are cross-sectional views illustrating a process of assembling the fastening apparatus for a vehicle according to the second embodiment of the present disclosure.
Figure 27:
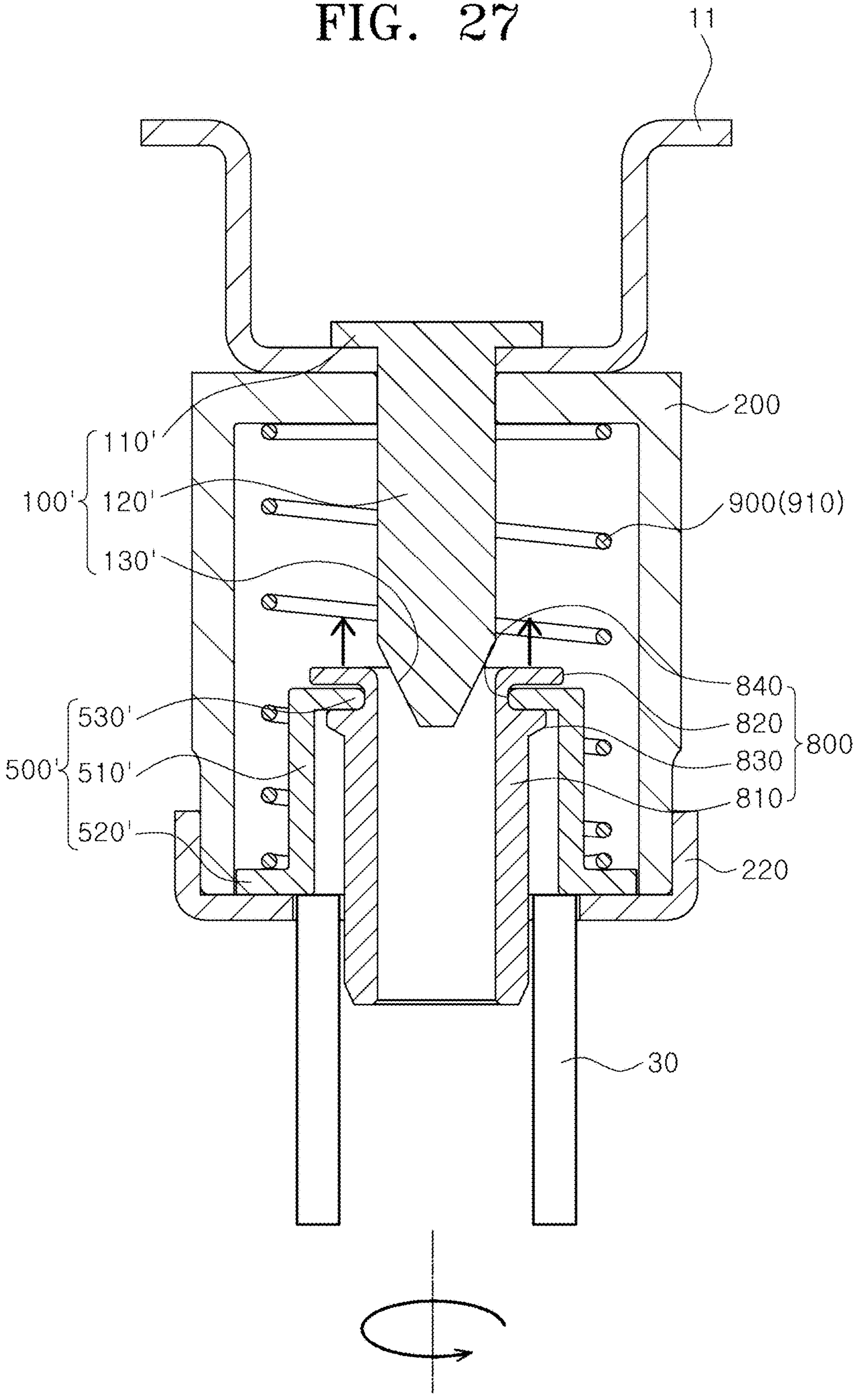
Figure 28:
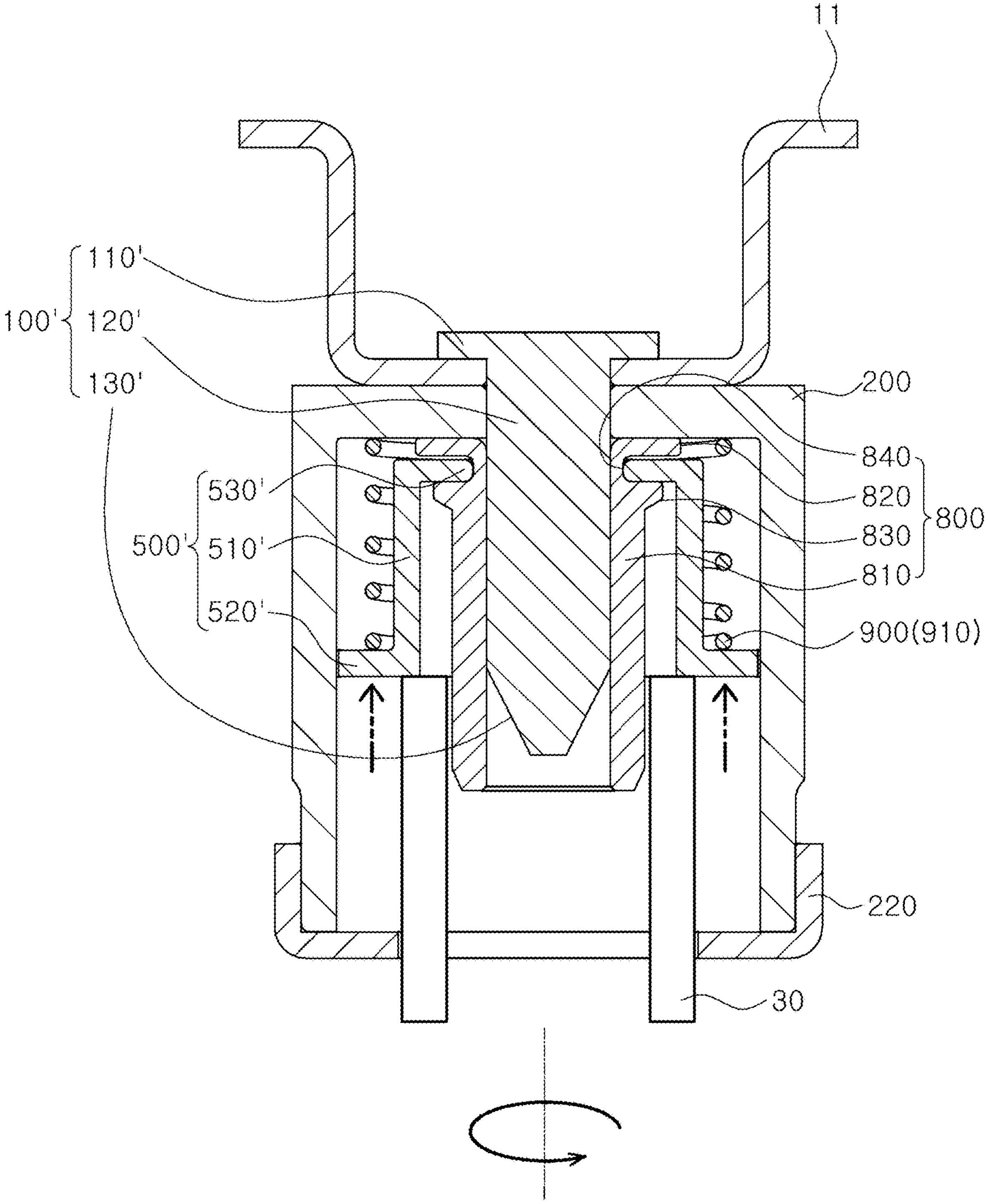

FIGS. 26 to 28 are cross-sectional views illustrating a process of assembling the fastening apparatus for a vehicle according to the second embodiment of the present disclosure.

Referring to FIGS. 26 to 28, the first fastener 100' is inserted into the case 200.

The entry guider 130' is inserted into the second fastening member 810 provided in the second fastener 800 that is disposed at its initial location thereof within the case 200, along with the elevation unit 500'. In this case, as the width of the entry guider 130' is formed to be reduced toward the end thereof, the entry guider 130' can be smoothly inserted into the second fastening member 810.

The work tool 30 is connected to the second fastening member 810 provided in the second fastener 800.

The work tool 30 adds rotatory power to the second fastener 800 and simultaneously upward pushes the elevation unit 500'. In this case, as the flange member 520' is formed to have a greater diameter than the tool hole part 221, the work tool 30 can be prevented from coming into direct contact with the elastic member 910.

As the elevation unit 500' moves upward at a predetermined distance, the inner circumference surface of the second fastening member 810 is engaged with the outer circumference surface of the extension part 120'.

The second fastener 800 is continuously rotated by the work tool 30, spirally coupled to the first fastener 100', and moved upward from the case 200 along with the elevation unit 500'.

In this case, the elastic member 910 is contracted in the length direction thereof, and accumulates an elastic restoration force.

As the upper side of the elevation member 510' comes into contact with the inner side of the second structure 20, the assembly of the first fastener 100' and the second fastener 800 is completed.

A process of separating the first fastener 100' and the second fastener 800 from each other is performed in the inverse order of the process of fastening the first fastener 100' and the second fastener 800 together.

As the spiral coupling of the first fastener 100' and the second fastener 800 is released, the elastic member 910 extends in the length direction thereof by the elastic restoration force accumulated therein, and moves the elevation unit 500' and the second fastener 800 downward. Accordingly, the elevation unit 500' and the second fastener 800 are returned to their initial locations.

The fastening apparatus for a vehicle according to the present embodiment can prevent the waste of a machine and manpower for an additional feeding work and prevent a loss of parts upon assembly because parts necessary to fasten the first structure 10 and the second structure 20 are implemented as one assembly. The fastening apparatus for a vehicle according to the present embodiment can prevent a miss assembly because the second fastener 800 is supported by the elevation unit 500' in a way to be rotatable and movable up and down in the state in which the second fastener 800 has maintained its regular location with respect to the first fastener 100'.

The fastening apparatus for a vehicle according to the present embodiment can reduce the number of parts because the second fastener 800 is directly rotatably supported by the elevation unit 500'.

In the fastening apparatus for a vehicle according to the present embodiment, the hook 820 comes into contact with the top of the case 200 on the inside thereof, and the support member 530' does not come into contact with the top of the case 200 on the inside thereof by the hook 820. Although the second fastener 800 continues to be rotated, the free end of the support member 530' that has been formed to be round so that the free end has given curvature comes into contact with the inner side of the insertion groove 840 that has been formed to be round so that the inner side has given curvature. A lubricant is applied on the inner side of the insertion groove 840. The gap G is formed between the support member 530' and the hook 820. Accordingly, the elevation unit 500' can be prevented from being broken because rotatory power of the second fastener 800 is not transferred to the elevation unit 500' and only the second fastener 800 is smoothly rotated.

The fastening apparatus for a vehicle according to the present embodiment can improve efficiency and consistency of an assembly because the first fastener 100' and the second fastener 800 can be repeatedly fastened together and separated from each other by the restoration unit 900.

The fastening apparatus for a vehicle according to the present embodiment can reduce the weight of a product and can be more easily assembled because both ends of the restoration unit 900 come into direct surface contact with the case 200 and the elevation unit 500'.

The fastening apparatus for a vehicle according to the present embodiment can prevent interference with the work tool 30 because the restoration unit 900 is disposed between the upper side of the flange member 520' and the inner side of the case 200 on the upper side thereof.

The present disclosure has been described above based on the embodiments illustrated in the accompanying drawings, but the embodiments are merely illustrative. A person having ordinary knowledge in the art to which the present disclosure pertains will understand that various modifications and other equivalent embodiments are possible from the embodiments.

Accordingly, the technical range of protection of the present disclosure should be determined by the claims below.

What is claimed is:

1. A fastening apparatus for a vehicle, comprising:

a first fastener fixed to a first structure;

a second fastener coupled to a case fixed to a second structure and configured to have the first fastener inserted therein along a first direction;

a fixing unit movably installed in the second fastener and configured to move in a second direction that intersects the first direction, and to selectively limit relative movements of the first fastener and the second fastener;

an elevation unit installed in the case and movable up and down, and configured to be moved up and down by an external force that is applied from a work tool;

a restoration unit installed between the case and the elevation unit, the restoration unit being stretchable in the first direction; and a detachment prevention unit coupled to the second fastener and configured to prevent the elevation unit from being detached from the case, wherein the fixing unit is moved to a first location in the second fastener as the elevation unit is moved up and the restoration unit is compressed, wherein the fixing unit is moved to a second location in the second fastener, which is an inner position than the first location in the second direction, as the elevation unit is moved down, wherein the first fastener comprises:

a first body inserted into the second fastener; and a trapping part concavely depressed from an outside of the first body, wherein the second fastener comprises:

a flange coupled to an inner side of the case;

a second body extended from the flange in the first direction and configured to have the first body inserted therein; and an accommodation part formed to penetrate the second body and configured to support the fixing unit that is movable in the second direction, wherein the elevation unit comprises:

an elevation member disposed to surround the second fastener, and installed in a way to be slidable in the first direction; and a guide member disposed between the elevation member and the second fastener and configured to provide guidance to a movement of the fixing unit while operating in conjunction with an elevation movement of the elevation member, wherein the guide member comprises:

a first guide member concavely depressed from an inner side of the elevation member and configured to dispose the fixing unit at the first location in the accommodation part;

a second guide member configured to protrude from the inner side of the elevation member and to dispose the fixing unit at the second location in the accommodation part; and a third guide member disposed between the first guide member and the second guide member and configured to provide guidance to a movement of the fixing unit from the first location to the second location, or from the second location to the first location, wherein the detachment prevention unit comprises:

a coupling part having an outer circumference surface that is inserted into an inner circumference surface of a bottom end of the second body; and a detachment prevention member extending from a bottom end of the coupling part in a radial direction and having an upper surface coupled to a lower surface of the second body, and wherein the detachment prevention member is separated from the elevation unit and the case as the restoration unit is compressed by the external force, and the elevation unit comes into contact with the detachment prevention member as the restoration unit is restored to an initial position.

2. The fastening apparatus of claim 1, wherein the first fastener further comprises an entry guider extended from the first body and configured to provide guidance to the first body so that the first body enters the second fastener.

3. The fastening apparatus of claim 2, wherein the entry guider is formed so that a width of the entry guider is reduced toward an end thereof.

4. The fastening apparatus of claim 1, wherein the accommodation part is formed so that a width of the accommodation part is reduced toward an inside of the second body.

5. The fastening apparatus of claim 1, wherein:

the accommodation part includes a plurality of accommodation parts, and the plurality of accommodation parts is disposed to be spaced apart from each other along a circumference of the second body.

6. The fastening apparatus of claim 1, wherein as the first body is fully inserted into the second body, the accommodation part is connected to the trapping part.

7. The fastening apparatus of claim 1, wherein the restoration unit is configured to restore the elevation unit to an initial location as the external force applied from the work tool to the elevation unit is released.

8. The fastening apparatus of claim 7, wherein both ends of the restoration unit in the first direction come into surface contact with a flange of the second fastener and the elevation unit, respectively.

9. The fastening apparatus of claim 8, wherein each of the both ends of the restoration unit has a semicircle-shaped cross-section form.

10. The fastening apparatus of claim 1, wherein the elevation unit further comprises an elevation guide member formed to have a form of a groove that is concavely depressed from an outer circumference surface of the elevation member toward an inside of the elevation member in a radial direction thereof, the elevation guide member extending in a direction parallel to the first direction, and wherein a rail part that protrudes from an inner surface of the case is seated in the elevation guide member, to provide guidance to an elevation operation of the elevation member with respect to the case.

11. The fastening apparatus of claim 1, wherein the third guide member is rounded with a designated curvature, which is formed to correspond to a curvature of the fixing unit.

12. The fastening apparatus of claim 1, wherein the accommodation part extends at a designated slanted angle, beginning at an outer circumference surface of the second body and extending toward an inner circumference surface of the second body.

13. A fastening apparatus for a vehicle, comprising:

a first fastener fixed to a first structure;

a second fastener coupled to a case fixed to a second structure and configured to have the first fastener inserted therein along a first direction;

a fixing unit movably installed in the second fastener and configured to move in a second direction that intersects the first direction, and to selectively limit relative movements of the first fastener and the second fastener;

an elevation unit installed in the case and movable up and down, and configured to be moved up and down by an external force that is applied from a work tool;

a restoration unit installed between the case and the elevation unit, the restoration unit being stretchable in the first direction; and a detachment prevention unit coupled to the second fastener and configured to prevent the elevation unit from being detached from the case, wherein the fixing unit is moved to a first location in the second fastener as the elevation unit is moved up and the restoration unit is compressed, wherein the fixing unit is moved to a second location in the second fastener, which is an inner position than the first location in the second direction, as the elevation unit is moved down, wherein the first fastener comprises:

a first body inserted into the second fastener; and a trapping part concavely depressed from an outside of the first body, wherein the second fastener comprises:

a flange coupled to an inner side of the case;

a second body extended from the flange in the first direction and configured to have the first body inserted therein; and an accommodation part formed to penetrate the second body and configured to support the fixing unit that is movable in the second direction, wherein the elevation unit comprises:

an elevation member disposed to surround the second fastener, and installed in a way to be slidable in the first direction; and a guide member disposed between the elevation member and the second fastener and configured to provide guidance to a movement of the fixing unit while operating in conjunction with an elevation movement of the elevation member, wherein the guide member comprises:

a first guide member concavely depressed from an inner side of the elevation member and configured to dispose the fixing unit at the first location in the accommodation part;

a second guide member configured to protrude from the inner side of the elevation member and to dispose the fixing unit at the second location in the accommodation part; and a third guide member disposed between the first guide member and the second guide member and configured to provide guidance to a movement of the fixing unit from the first location to the second location, or from the second location to the first location, wherein the detachment prevention unit comprises:

a coupling part having an outer circumference surface, extending parallel with the first direction, that is inserted into an inner circumference surface, extending parallel with the first direction, of a bottom end of the second body; and a detachment prevention member extending from a bottom end of the coupling part in a radial direction and having an upper surface coupled to a lower surface of the second body, and wherein an outer circumferential diameter of the coupling part is smaller than an inner circumferential diameter of the restoration unit.

* * * * *